United States Patent [19]

Levinson et al.

[11] Patent Number: 5,604,735
[45] Date of Patent: Feb. 18, 1997

[54] HIGH SPEED NETWORK SWITCH

[75] Inventors: Frank H. Levinson, Palo Alto; Mark J. Farley, Napa; Minh Q. Vu, San Jose; Calvin P.-K. Leung, Newark, all of Calif.

[73] Assignee: Finisar Corporation, Calif.

[21] Appl. No.: 440,088

[22] Filed: May 12, 1995

Related U.S. Application Data

[63] Continuation-in-part of Ser. No. 404,873, Mar. 15, 1995, Pat. No. 5,566,171.
[51] Int. Cl.$^6$ ................................................... H04Q 11/04
[52] U.S. Cl. ............................................. 370/360; 370/462
[58] Field of Search ............................. 370/14, 15, 58.2, 370/58.3, 60, 60.1, 61, 94.1, 94.2, 94.3, 85.6, 85.1, 85.4, 85.5, 85.14, 85.15, 62, 110.1, 32, 49.5, 16.1; 375/219, 220, 221, 222, 338, 340, 358, 252, 253; 340/825.05, 825.5, 825.51, 825.52, 825.79, 825.8, 826, 827; 379/88, 93, 202, 284, 290, 5; 455/38.1, 49.1, 39, 58.1, 73, 24, 69; 371/32, 20.5, 20.4, 20.3, 20.2, 20.1, 37.7

[56] References Cited

U.S. PATENT DOCUMENTS 5,267,235  11/1993  Thacker ..................................... 370/60
5,425,031  6/1995   Otsuka ..................................... 370/58.2
5,444,700  8/1995   Martikainen et al. .................. 370/58.2

OTHER PUBLICATIONS

"Application Note: Using the Buil–in Test/Diagnostics Port on FTR–XX10 Transceivers, FTM–XX10 Transmitters, FRM–XX10 Receivers," Finisar, Feb. 1994.

*Primary Examiner*—Douglas W. Olms
*Assistant Examiner*—Dang Ton
*Attorney, Agent, or Firm*—Gary S. Williams; Flehr, Hohbach, Test, Albritton & Herbert

[57] ABSTRACT

The present invention provides an improvement in circuit switching for a network comprising a switching apparatus including a plurality of transceivers for interfacing directly with a like plurality of nodes. Each of the transceivers has a receive and transmit through port for passing data to and from nodes. Transmitted data includes a connect/disconnect sequence, a first wait sequence, and user data. The switching apparatus further includes circuitry for isolating each transceiver so as to loop back data when not in use and a switching matrix for directly connecting any pair of transceivers. Each of the transceivers includes circuitry for detecting a connect and disconnect sequence and an interface for connection to a serial asynchronous receiver to derive node requests, routing data, priority and other information from the connect sequence detected at the transceiver. Derived switch configuration requests are processed by a node route control state machine, with each node route control state machine integrated in a bus architecture for configuring the matrix switch. A bus arbitration state machine controls the bus architecture servicing bus requests and providing bus grants for the transfer of routing information to switch control logic and a command sequencer. The requesting node may set a priority for a connection request, queue a connection request or alternatively request data from the switch controller micro-controller core.

17 Claims, 16 Drawing Sheets

ARBITER STATE MACHINE DIAGRAM

NODE CONTROLLER STATE MACHINE DIAGRAM

HIGH SPEED NETWORK SWITCH

This application is a continuation-in-part of application Ser. No. 08/404,873, filed Mar. 15, 1995 now U.S. Pat. No. 5,566,171.

The present invention relates generally to communication networks. More particularly, to a switching apparatus for configuring a network for node-to-node communications.

BACKGROUND OF THE INVENTION

The present invention provides an improvement in communication networking by providing a high-speed routing mechanism for transmitting data between nodes on a communications network.

Conventional local area networks provide switches or bridges for linking users on a network. Switching systems in a communications network environment process requests from users to link a requesting user node with a destination node by decoding packets containing routing information generated by the requesting node.

Message switching is a form of data switching which relies on a store-and-forward technology. Each switch within a given network stores a network message in its entirety (packets) and transfers them out of storage upon the availability of the destination node. Often interrupt strategies are employed to achieve near real-time operation over portions of the network that are nearly transparent to the end users. Storage costs and complex interrupt handlers make these systems undesirable for low cost networks which seek to operate at or near real time with minimal system latency.

Circuit switching is a form of data switching which dedicates system resources to a particular call or transaction. Physical resources in time, space or frequency spectrum are dedicated to the exclusive use of a single call for the duration of that call. Circuit switching apparatus contain no storage devices, and merely route information based on the availability of a given destination node. Accordingly, "blocking" may result, wherein a call or transaction may not be established, due to the dedicated nature of the circuit switching connections whenever a system resource is in use.

Circuit switching systems operate in real time providing node to node communications once a connection is made between a source and destination. The performance of a circuit switching system can be measured in terms of connect time and latency. Connect time refers to the amount of time it takes to make a requested connection between a source and destination node in a network. Latency is a related consideration which refers to the time period between the application of a stimulus (a request for connection in a network) and the first indication of a response from the network. Most network communications are inherently short duration in nature, on the order of magnitude of 5 milliseconds or less. Accordingly, networks employing circuit switching systems are required to rapidly connect and disconnect physical resources as fast as possible to avoid "blocking" of transactions, and achieve transparent real time communications on the network. Any improvements in speeding up the connect and disconnect cycles as well as improving the overall system latency is desirable in networks employing circuit switching.

SUMMARY OF THE INVENTION

It is an object of the present invention to provide a high bandwidth, and high speed switching system with minimal latency for network communications.

It is a further object of the present invention to provide a high speed switching system which directly switches available resources while also allowing for a user to queue a routing request to Initiate connection upon resource availability.

The apparatus of the present invention comprises a switching apparatus including a plurality of transceivers for interfacing directly with a like plurality of user nodes. Each of the transceivers has a receive and transmit through port for passing data to and from user nodes and a network. Transmitted information includes a connect symbol, a first wait sequence, user data and a disconnect symbol. The switching apparatus further includes circuitry for isolating each transceiver so as to loop back data when not in use and a switching matrix for directly connecting any pair of transceivers. Each of the transceivers includes circuitry for detecting connect and disconnect symbols and an interface for connection to a serial asynchronous receiver to derive node requests, routing data, priority and other information from the connect symbols detected at the transceiver. Derived switch configuration requests are processed by a node route control state machine, with each node route control state machine integrated in a bus architecture for configuring the matrix switch. A bus arbitration state machine controls the bus architecture servicing bus requests and providing bus grants for the transfer of routing information to switch control logic and command sequencer. In operation, a requesting node transmits a connect sequence consisting of 11 symbols (1 symbol=1 forty bit word), waits a predefined period while sending idles and then transmits user data to the network switch assuming node-to-node communication has been established with a destination node. In the event a connection fails to be made, the isolation circuitry loops user data back to the requesting node indicating the destination node is unavailable. The requesting node may set a priority for a connection request, queue a request for a destination node that is currently busy, or alternatively request data from the switch micro-controller core. In the preferred embodiment, the microcontroller core continuously monitors the status and operational levels for all attached nodes, thus forming a network diagnostic subsystem.

In a second embodiment, a multi-switch configuration may be implemented whereupon a requesting node will generate a plurality of connection request sequences, each sequence consisting of 11 symbols, so as to initiate node-to-node communication with a destination node connected to a different switch.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
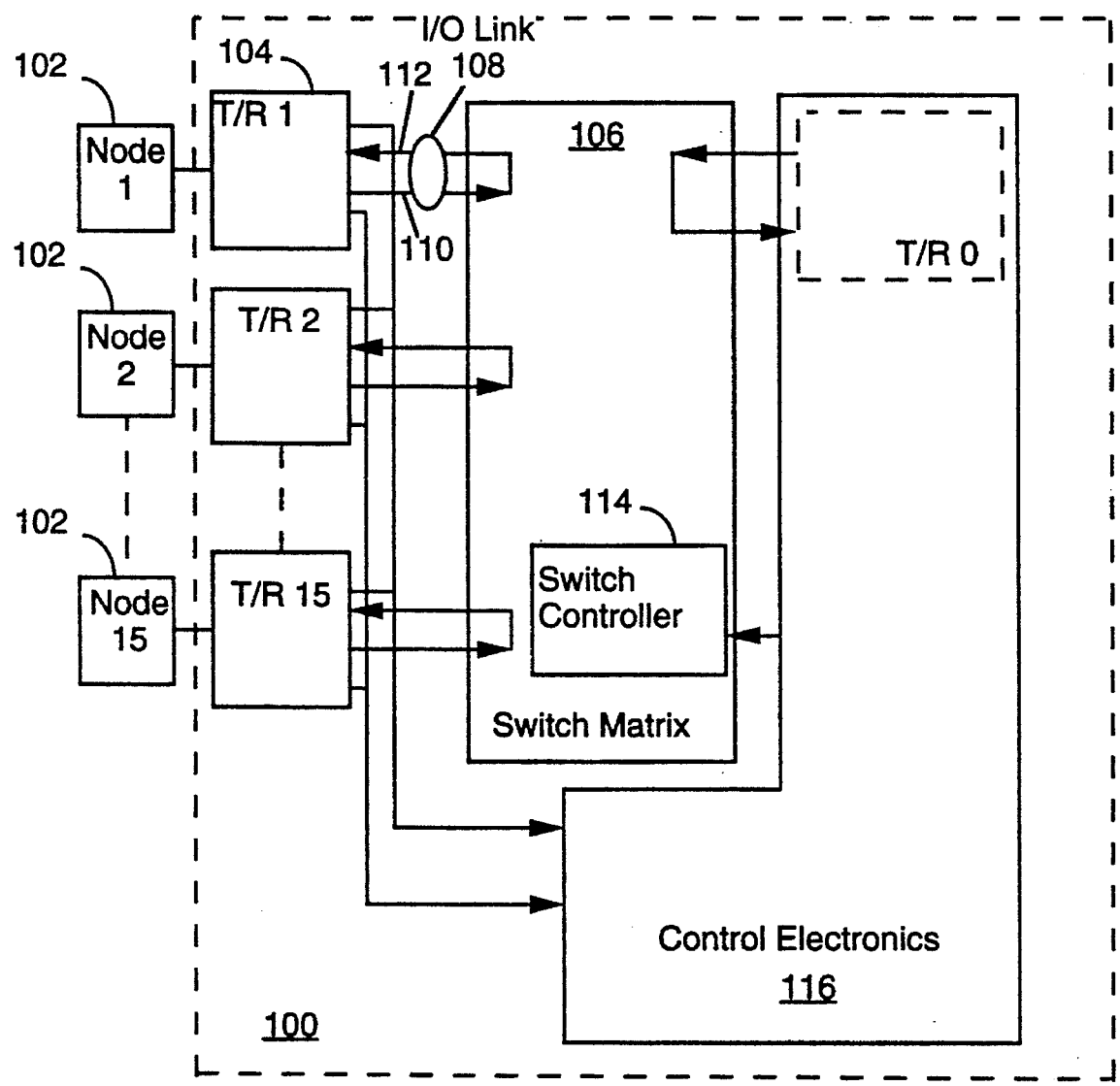
FIG. 1 is a block diagram of a switching apparatus according to the preferred embodiment of the present invention.

Referring first to FIG. 1, a switching apparatus 100 incorporating the teaching of the present invention is shown. A plurality of nodes 102 are connected to the switch 100 at a like plurality of transceivers 104. The transceivers 104 receive and transmit serial data between the switching apparatus 100 and the nodes 102. Each transceiver 104 is coupled to a switch matrix 106 via a high speed serial I/O link 108. The high speed serial I/O link includes separate transmit 110 and receive links 112 thereby allowing for full duplex operation in each node to node connection.

For the purposes of this document, both host computers and switches shall sometimes be called "nodes." The transceivers 104 of a switch can be connected to any network node, regardless of whether that node is a switch or an end user's host computer.

The switch matrix 106 includes a switch controller 114 for configuring the transmit 110 and receive links 112 of each transceiver to either loop back data or establish full duplex communication with any other node 102 connected to the switch matrix 106. Control electronics 116 coupled to the switch matrix 106 configures the switch matrix 106.

Figure 2:
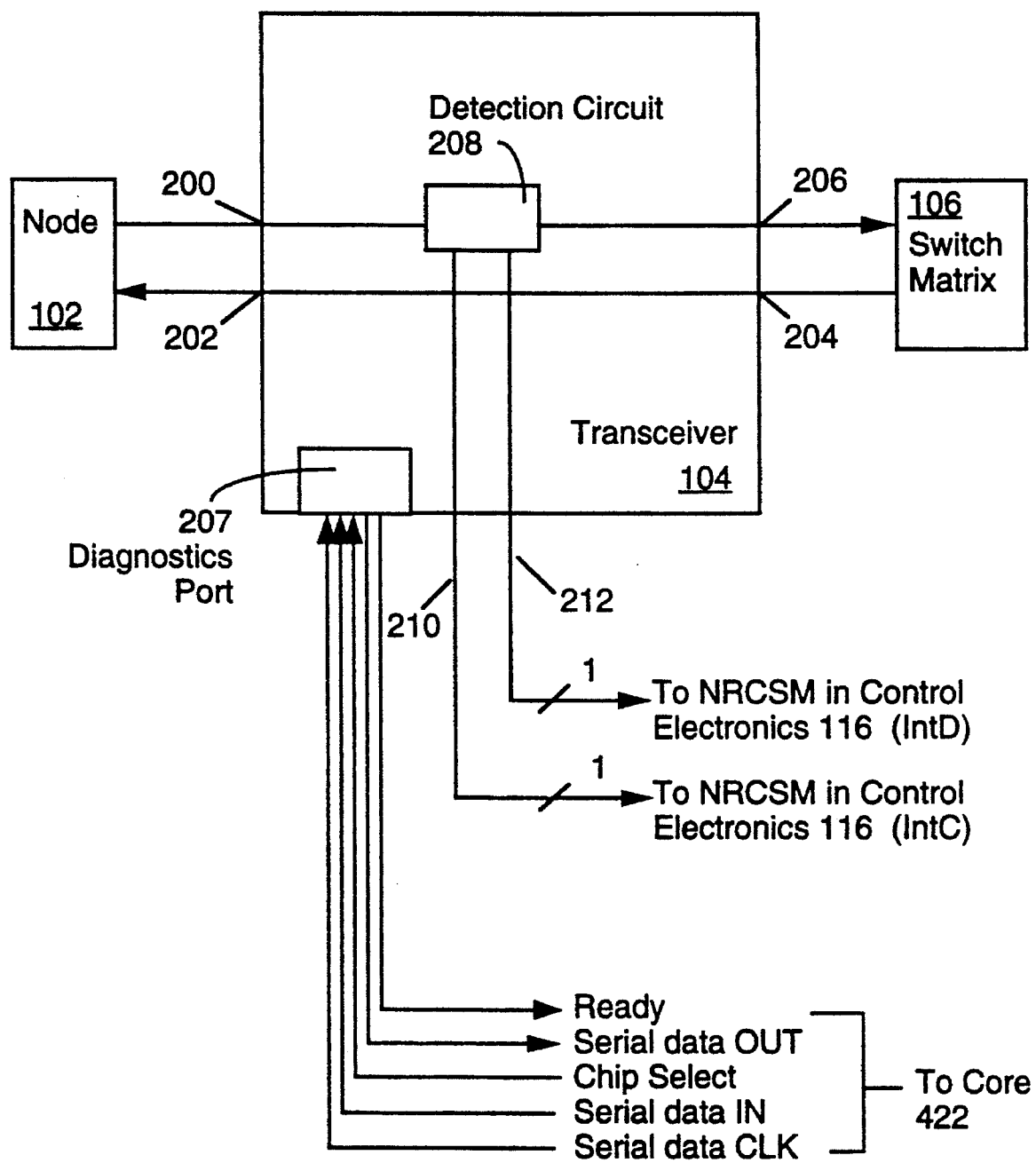
FIG. 2 is a block diagram of a transceiver according to the preferred embodiment of the present invention.

Referring now to FIG. 2, a transceiver 104 according to the preferred embodiment of the present invention is shown. The transceiver 104 has a first serial data input 200 and first serial data output 202 for transmitting data between a user node 102 and the transceiver 104. The transceiver 104 also includes a second serial data input 204 and second serial data output 206 for transmitting serial data between the transceiver 104 and the matrix switch 106.

A diagnostics port 207 is provided to monitor transceiver 104 performance by the control electronics 116, as well as for transmission of diagnostics data by the switch to the node associated with the transceiver 104. The diagnostics port 207 has five signal lines including a chip select line for enabling use of the diagnostics port 207 for a given transceiver; a ready line for signalling that the diagnostic port is ready to receive serial data; a first serial data line for transmitting transceiver diagnostics data to the switch 100; a second serial data line for transmitting diagnostics commands or data from the switch 100 to the transceiver; and a bit shift clock signal line for assisting in the serial transmissions between the diagnostic port and the switch.

In the preferred embodiment, the transceiver 104 is a plug-and-play style device which may be plugged into the switching apparatus as required to meet various node transmission requirements. The transceivers may be customized to conform to user node requirements such as optical transceivers for converting fiber optics transmissions, RF transceivers or a conventional twisted pair configuration. The switching apparatus may be configured with a plurality of interfaces designed to meet the individual needs of the individual nodes. In the preferred embodiment fiber optic receivers (Fiber Optic Transceiver, part number FTR-8510-1SW manufactured by Finisar) are used providing an optical interface between the nodes and the switching apparatus.

The transceiver 104 also includes a detection circuit 208 and corresponding connect 210 and disconnect output port 212 for detecting initiation and termination sequences passed from a source node to the switching apparatus 100. The detection circuit 208 monitors the serial transmission stream from its corresponding node 102, waiting for the detection of a connection or disconnection sequence. In the preferred embodiment of the present invention, the connection sequence is a series of eleven "words" each of 40 binary bits transmitted by the source node. The words are either one of two forms, a connect word (IntC word) or a neutral word (IntN word). The connection sequence generated by a source node indicates to the switch matrix route and data requests as well as other control information. In the preferred embodiment, the 11 word connect sequence is an encoded sequence representative of 2 start bits, followed by 8 data bits and one parity bit. The eight data bits are broken down as follows: five bits for route/data information (up to 32 destination nodes represented by combinations of the 5 bits), one bit for route or data mode (e.g. the first five bits are to be interpreted as route or data), one bit for low/high priority, and finally one bit for queued mode or another optional feature.

The encoding of the connection sequence takes place at the source node 102, where particular combinations of the connect word (IntC) and the neutral word (IntN) are arranged using an alternate mark inversion (AMI) like encoding technique. In the preferred embodiment, every connection sequence begins with a pair of connect words (IntC, IntC, . . . ), representative of a "10" sequence of start bits. An encoded sequence representative of the remaining 8 data bits and one parity bit is then generated by comparing the last bit sent (binary representation) with the next bit in line. If no state change is to occur (e.g. the combination of the last and next bit is 00 or 11) then a neutral word is generated for transmission down to the transceiver 104. If a state change is to occur (e.g. the combination of the last and next bit is 01 or 10) then a connect word is generated for transmission down to the switch matrix transceiver 104. This encoding continues until the last bit (the parity bit) is encoded thereby generating the last word of the 11 word connection sequence for transmission to the transceiver 104.

In the preferred embodiment of the present invention the connection word is a series of 24 binary 1's, followed by 8 binary 0's, followed by a 10101010 binary pattern, and the neutral word is a series of 40 binary bits alternating between 1 and 0, starting with a 1. The neutral word may be formed of other combinations of binary 1's and 0's which are distinguishable from the connect and disconnect sequences. The preferred embodiment employs a capacitive detector which detects the series of continuous 1's (or 0's) and starts a connection Cycle. As such the neutral word must be defined so as assure a complete discharge of the capacitive detector. The decoder 208 includes a connect sequence output port connected to a port dedicated state machine in the control electronics 116 via the connect output pin 210.

In the preferred embodiment the disconnection sequence is a single 40 bit disconnect word (IntD) comprising a series of 24 binary 0's, followed by 8 binary 1's, followed by a 01010101 binary pattern. A source node 102 which desires to reconfigure from its current switch configuration and return to a loopback condition will generate the disconnect word (IntD) for transmission to the transceiver 104. The decoder 208 in the transceiver 104, decodes the disconnect sequence, and issues a disconnect service request to the port dedicated state machine in the control electronics 116 associated with this port on disconnect output pin 212.

Those ordinarily skilled in the art will recognize that the particular sequence of binary 1's and 0's selected may be of other lengths or combinations in either the connect or disconnect sequence. The particular combinations of 1's or 0's were selected to both minimize the occurrence of conflicts associated with real data and the connect or disconnect sequences themselves and also to assure a complete discharge of the capacitive detector used in the preferred embodiment of the present invention. The detection circuit 208 may be implemented using RC circuits and comparators or by other circuitry known in the art.

Figure 3:
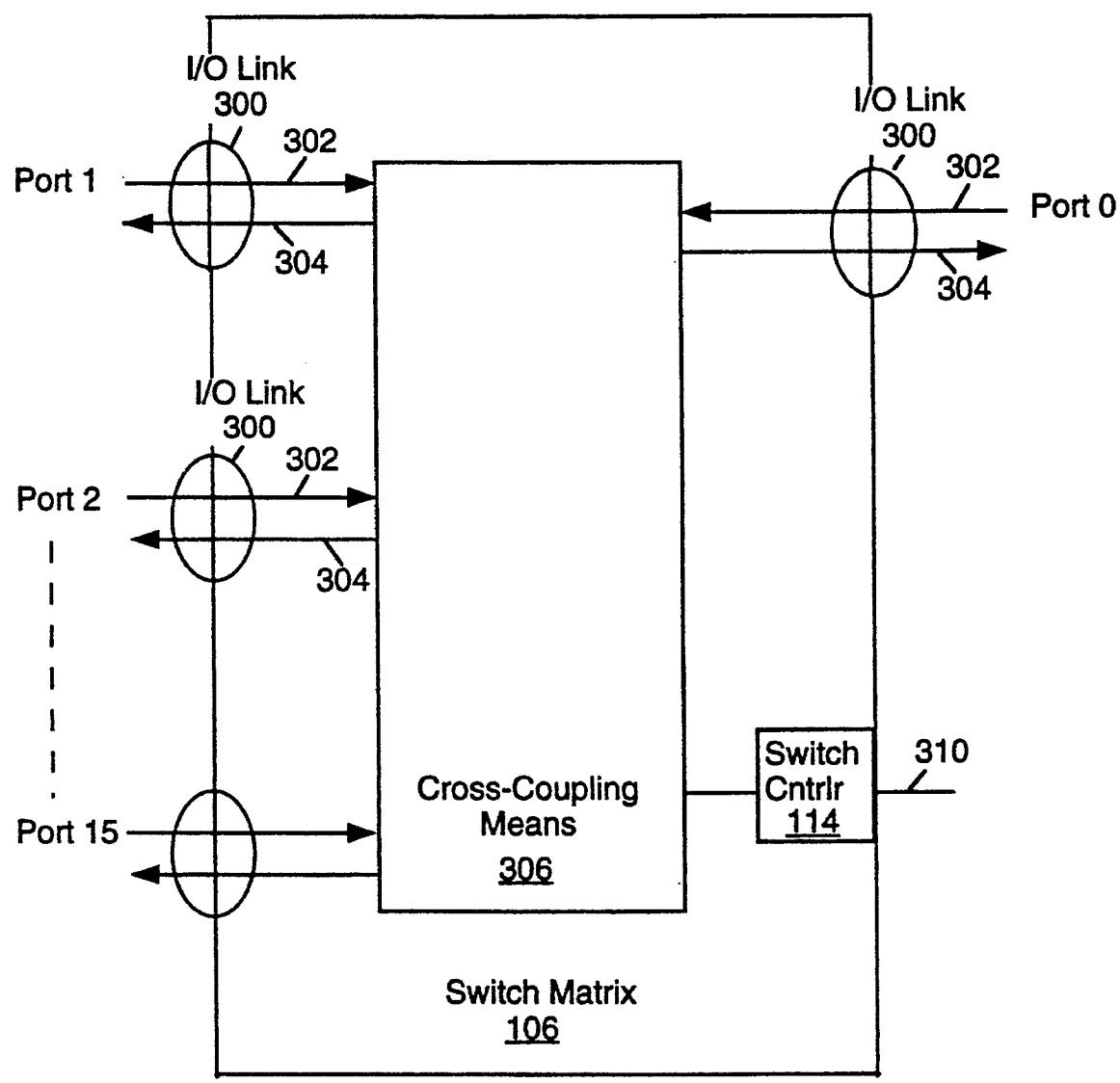
FIG. 3 is a block diagram of a switch matrix according to the preferred embodiment of the present invention.

Referring now to FIG. 3, the switch matrix 106 of the preferred embodiment of the present invention is shown. The switch matrix 106 includes a plurality of ports 300, each having an input 302 and output 304. Each transceiver 104 is coupled to the switch matrix 106 at one of the ports 300. More specifically, the second serial data output 206 from each transceiver 104 is coupled to an input 302 of a corresponding port 300. Similarly, the second serial data input 204 from each transceiver 104 is coupled to an output 304 of the same port 300. In this way, by configuring the switch matrix 106 to couple a particular port's input 302 to the same port's output 304, a loop-back configuration may be established for any individual node. In loop-back, any serial transmissions generated by a source node as an output will be looped-back by the switch matrix to the same source node as an input.

In the preferred embodiment, the switching apparatus 100 is configured to include 16 ports in the switch matrix 106. This configuration will support switching between 16 different nodes in an isolated switch network, or combinations of 16 different nodes and other switches in a multiple switch environment. Those ordinarily skilled in the art will recognize that any number of ports (n ports) may be provided in the switch matrix to service n devices.

The switch matrix 106 includes cross-coupling means 306 for coupling any pair of inputs 302 and outputs 304, thereby establishing full duplex communication between any source and any destination node in the network. The switch matrix 106 further includes a switch controller 114 for receiving matrix configuration commands via a command port 310. The switch controller 114 processes connect and disconnect requests generated by the control electronics 116. In the preferred embodiment of the present invention, switch matrix 106 is a sixteen port cross point switch part number TQ8017 manufactured by Triquint Semiconductor, Inc.

Figure 4:
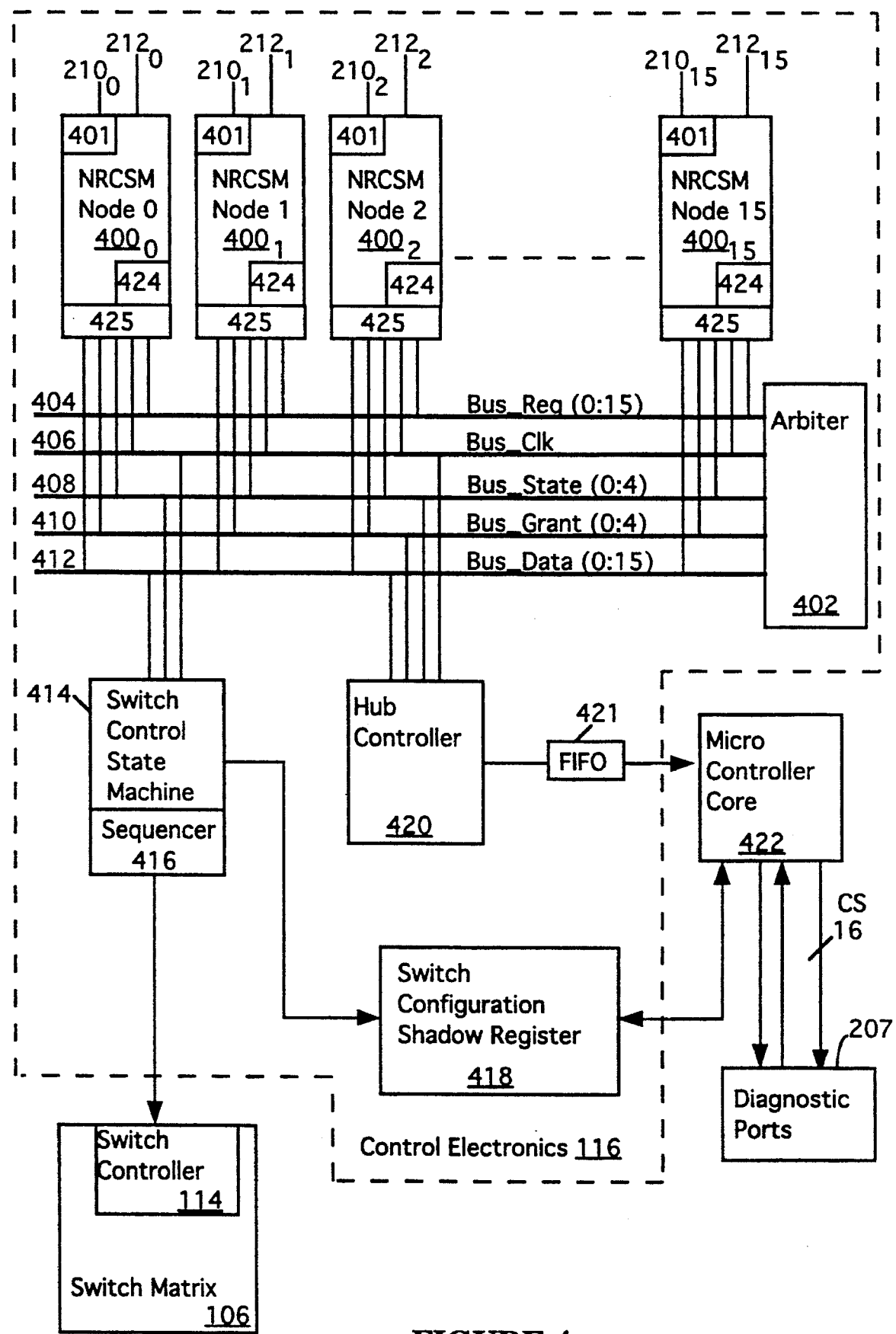
FIG. 4 is a block diagram of the control electronics for configuring the switch matrix.

Referring now to FIG. 4, the control electronics 116 of the present invention is shown. A plurality of Node Route Control State Machines $400_{0-15}$ (NRCSM) are connected one to each transceiver 104 via the connect output pin $210_{0-15}$ and disconnect output pin $212_{0-15}$. Each NRCSM 400 includes a serial asynchronous receiver (SAR) 401 for processing the 11 word connect sequence cycle and a hunt group state machine 425. The function and connection of the hunt group state machine will be discussed in further detail below.

The connect output pin $210_{0-15}$ from each detector 208 of each associated transceiver 104 transmits the detected connect sequence cycle to the serial asynchronous receiver (SAR) 401 within each NRCSM 400 for processing. The SAR 401 uses a free running clock and an edge trigger (start bit) state machine to extract 8 bits of data from the 11 word connection sequence. The 11 word connection sequence is translated by the SAR 401 into two start bits, 8 data bits, and one parity bit. In the preferred embodiment, the SAR 401 has two forms of error detection, first the two start bits must be received before any route/data information is processed, and secondly, the SAR 401 will check the parity by use of the translated parity bit to assure data integrity.

The disconnect output pin $212_{0-15}$ transmits disconnect service requests (IntD) detected by the detector 208 of a given transceiver 104, indicating the source node desires to re-establish a loopback configuration.

Each NRCSM $400_{0-15}$ is connected to five shared busses in a bus architecture to a bus arbiter 402. The five busses connected to each NRCSM are: Bus_Request 404 for use by a NRCSM for scheduling a connection request; Bus_Clock 406 for timing data bus transfers; Bus_State 408 for indicating which of the six states the arbiter currently is operating in; Bus_Grant 410, an acknowledgment signal from the arbiter 402 that for the next two clock cycles the authorized NRCSM may utilize the data bus; and Bus_Data 412, the data bus for transmitting route information between the nodes and the switch controller state machine.

The Bus_Request bus 404 is shown in bus form, however, in the preferred embodiment, is actually 16 individual single bit signals originating one at each of the sixteen NRCSMs $400_{0-15}$. Each of these individual busses is terminated at the arbiter 402. Those ordinarily skilled in the art will recognize that the individual connection scheme allows for simultaneous requests to be issued to the arbiter 402. In an alternative embodiment, a multi-bit signal is received from each NRCSM which includes priority information.

The Bus_Clock bus 406 is a single bit wide and contains the bus clock signal generated by the bus arbiter 402 for control and timing of the transmission of data on the bus architecture.

The Bus_State bus 408 is five bits wide and contains the status information for the current state of the bus arbiter 402. The bus arbiter 402 has six states which are transmitted via this bus to each of the NRCSM $400_{0-15}$, to switch controller state machine 414 and the hub controller interface logic 420. The six states are: Bus Request state 00000, Bus Grant state 00001, Command (Node Request) state 00010, Node Response state 00100, Hunt Group Request state 01000, and the Hunt Group Grant state 10000. The status of the bus arbiter 402 will be discussed in greater detail below.

The Bus_Grant bus 410 is 5 bits wide and carries the ID of the NRCSM which has been selected to be serviced based on a bus request signal sent to the arbiter 402 during the first cycle of the bus arbitration (corresponding to the Bus Request state 00000 in the arbiter 402) or during a hunt group arbitration (corresponding to the Hunt Group Request state 01000 in the arbiter 402). The Bus_Grant bus 410 is active during the second cycle of the bus arbiter state machine cycle (Bus Grant state 00001) and during the hunt group grant cycle (corresponding to the Hunt Group Grant state 10000).

The Bus_Data bus 412 is 16 bits wide and carries route and data information to be passed between the NRCSMs. The Bus_Data bus 412 is active during the Command (Node Request) state 00010 and Node Response state 00100 cycles of the bus arbiter 402. During the Command (Node Request) state 00010, the Bus_Data bus 412 carries the route information from the source NRCSM which has been granted the use of the data bus. During the Node Response state 00100, the Bus_Data bus 412 carries reply information from a destination node requested by the selected NRCSM in the form of a 16 bit data word either granting or denying the route requested. A typical Bus_Data signal contains a 5-bit source node ID, a 5-bit destination node ID, a 1-bit route/data designation (i.e., indicating whether the destination node ID field should be interpreted as route or data information), a 1-bit queued mode flag, a 1-bit priority flag, and 3 command/response bits.

A switch controller state machine 414 is coupled to the Bus_Clock bus 406, the Bus_State bus 408 and the Bus_Data bus 412. The switch control logic circuit 414 snoops on the Bus_State bus 408 waiting for the grant of the data bus to a source NRCSM and retrieves data from the Bus_Data bus 412 during the Command and Response cycles. The switch controller state machine 414 formats the command information to be transmitted to the switch matrix 106 by means of a sequencer 416. The switch control logic also maintains a switch configuration shadow register 418 that stores data representing the current configuration of the switch matrix 106.

Finally, the micro-controller core 422 is connected to the 5 bus architecture via the hub controller 420. The core micro-controller and hub controller 420 acts much the same as one of the NRCSM and its associated node. The micro-controller core 422 may receive data from each of the nodes connected to the switch matrix. The actual transmission of data to the core-controller will be described in greater detail below in conjunction with the description of a typical route or data request.

Transmitting Switch Diagnostics to a Node

Transmission of data by the controller core 422 to the nodes 102 is performed via the diagnostics signal lines 207. In particular, a node can request diagnostics data from the controller core 422 by sending an eleven word connect sequence to the switch 100 in which the route/data bit flag is set to the "data" value and the 5-bit "destination node ID" is set to a predefined diagnostics request command value, such as "11110." After sending that command, the source node 102 continually transmits a fixed signal pattern, preferably the neutral 1010 . . . sequence, until all the requested diagnostics data has been received by the source node. In addition, upon sending the diagnostics request command, the source node commands its host adapter to decode data patterns superimposed on top of the transmitted fixed signal pattern and to thereby recover diagnostics data transmitted to it by the switch's controller core 422.

When the hub controller 420 detects the data flag and diagnostics request command on the Bus_Data bus 412, it prompts the controller core 422 to perform a self-diagnostics procedure and to transmit a packet of diagnostics data to the source node. More particularly, it stores a diagnostics command in a command FIFO 421 identifying the port which has made the request, and the received command. The controller core 422 receives the command from the FIFO 421 and then processes each such command. The FIFO 421, which may be incorporated into the controller core 422, allows the switch 106 to receive and store several commands from one or more of the nodes coupled to the its ports while it processing a first such command. Each stored command is then processed in the order received.

To transmit diagnostics data to the source node, the controller core 422 enables one of sixteen transceiver diagnostics chip select lines, and then transmits diagnostic data to the selected transceiver via the diagnostic port's inbound serial line. The diagnostics data is transmitted at a relatively slow rate, such as a rate between 1,000 and 10,000 bits per second, by the selected transceiver 104 by turning its transmitter on and off so as to superimpose a data pattern on top of the fixed signal pattern that is being transmitted by the source node 102 through the switch 100 and back to itself. The source node's host adapter detects the on/off sequence superimposed on the fixed signal pattern and thereby decodes and recovers the transmitted diagnostics data packet. The diagnostics data packet has a predefined fixed length, such as 1024 or 2048 bits, and when the source node has received that much data, it's host adapter is commanded by the associated node to resume its normal mode of operation.

Bus Arbiter State Machine

Figure 5:
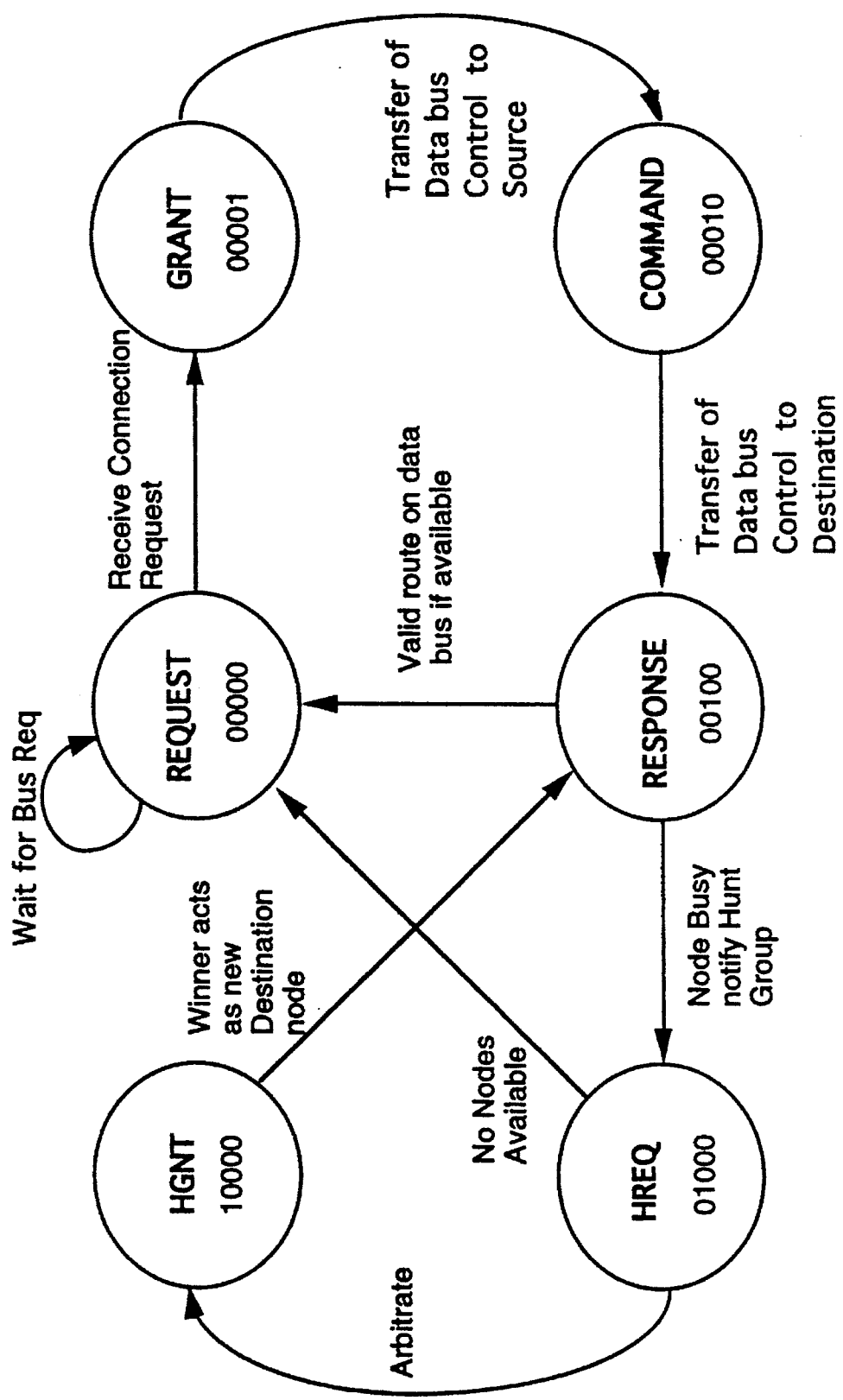
FIG. 5 shows the state machine diagram for a bus arbiter according to the preferred embodiment of the present invention.

Referring now to FIG. 5, a state diagram for the bus arbiter 402 is shown. The state machine for the bus arbiter 402 has six states: Bus REQUEST state 00000, Bus GRANT state 00001, COMMAND (Node Request) state 00010, Node RESPONSE state 00100, Hunt Group Request (HG-REQUEST) state 01000, and the Hunt Group Grant (HG-GRANT) state 10000. When in the REQUEST state 00000, if no valid bus requests are received during the current clock cycle, the bus arbiter state machine remains in the REQUEST state 000 for another clock cycle. The bus arbiter state machine remains in the REQUEST state 00000 until at least one valid bus request is received by the arbiter, at which time the bus arbiter state machine transitions to the GRANT state 00001 at the next clock cycle, and then through the COMMAND 00010 and RESPONSE 00100 states and HG-REQUEST and HG-GRANT states if required, each for one clock cycle. During each arbiter cycle, the arbiter outputs a five bit state value indicating the state of the arbiter state machine. The arbiter also outputs one clock pulse on the Bus_Clock bus 406 for each arbitration cycle. This clock signal is used by the NRCSM's 400 and the hub controller interface logic 420 to synchronize themselves with the bus arbiter 402.

During the REQUEST state 00000, the arbiter may receive requests from each of the individual NRCSM's requesting access to the data bus for making or breaking matrix connections or passing data to and from the controller 420. A single line from each node's NRCSM is tied to the arbiter 402 along with one from the hub controller interface logic 422. The lines are sampled on the rising edge of the clock during the 00000 state and a priority encoder inside the arbiter 402 chooses one node's NRCSM to control the bus for the remainder of the regular arbitration cycle.

During the GRANT state 00001, the arbiter 402 processes the requests from the NRCSM's received during the REQUEST state and grants one NRCSM (or the hub controller) access to the data bus (Bus_Data bus 412) for the next two clock cycles by issuing the appropriate NRCSM address ($00000_b$-$01111_b$ associated with $NRCSM_{0-15}$ or hub controller address $10000_b$) on the Bus_Grant bus 410. In the preferred embodiment, the NRCSM address is 5 bits long, and as such can uniquely identify up to 32 NRCSM's connected in the bus architecture. This address is read by all of the NRCSMs and the hub controller circuitry 422 and determines which device controls the arbitration bus for the remainder of the current arbitration sequence.

During the COMMAND state 00010, having granted access to the source NRCSM (or the hub controller), the 402 arbiter turns over the data bus (Bus_Data bus 412) allowing the "winning node" to place a mute request or data for the micro-controller 422 onto the data bus. The actual command information provided to the bus is a 16 bit word which includes a 5-bit source node ID, a 5-bit field containing either a destination node ID or a 5 bit datum for the microcontroller 422, a 1-bit route/data designation flag, 1-bit queued mode flag, a 1-bit priority flag, and 3 command/response bits.

The final state in a regular arbitration cycle is the RESPONSE state 00100 in which the "winning node" is informed whether the requested route is to be allowed by the NRCSM of the destination node. Each NRCSM maintains a configuration log 424 with the current switch configuration for its associated node. During the COMMAND state all of the NRCSMs snoop on the data bus looking for either their own address (indicating a connection request) or the address of the node to which they are currently connected (in case of a disconnect request by the node currently connected to its associated node). Upon recognizing its own address as the destination of a matrix connection, the destination NRCSM will grant or deny access based on the availability of the individual node. Accordingly, after having snooped the data bus during the COMMAND state, the destination node's NRCSM will place a Grant Signal (or a Not Granted Signal) back on the data bus during the RESPONSE state based on the availability of the destination node.

In the preferred embodiment, the Grant Signal is a 16 bit word having source node and destination node ID information which corresponds to the requested configuration, or to an associated derived disconnect sequence. In particular, the 16-bit Grant Signal word asserted by the destination NRCSM on the data bus 412 includes first and second 5-bit node ID fields for identifying the destination and source nodes, respectively. In the event the destination NRCSM is busy, no Grant Signal is generated, resulting in a invalid connection. The switch control state machine will disregard the first connection sequence issued by the source node's NRCSM in this situation, and no connection sequence will be issued to the switch matrix. The function of the switch control state machine 414 will be described in greater detail below.

The source node's NRCSM snoops on the data bus during the RESPONSE state to verify whether a connection was granted, thereby allowing for the proper maintenance of its own configuration log 424.

The Bus Arbiter State machine also includes two additional states for use in conjunction with hunt groups. In the event the node requested during the COMMAND state (the destination node) is a member of a hunt group, then two additional arbiter states may be accessed. If the destination node is available, then the arbiter will transition to the RESPONSE state culminating in a Grant Signal from the destination node just as was described above in conjunction with a regular arbitration cycle. If, however, the destination node is busy, and it is part of a hunt group, then the destination node will issue a Hunt Request Signal on the Bus_data bus 412 during the RESPONSE state. In the preferred embodiment, the Hunt Request Signal is 16 bits in length and includes a first 5-bit hunt group ID field and a second 5-bit ID field for identifying the source node, as well as a 1-bit route/data designation flag, 1-bit queued mode flag, a 1-bit priority flag, a 1-bit Hunt Group Flag and 2 command/response bits. The source node ID information as well as priority, route/data, and queue mode information is derived from the connection request issued by the source node on the Bus_data bus during the COMMAND state. The Hunt Group Flag bit is set by the destination node to indicate to the arbiter that the special Hunt Group arbitration cycles should be invoked.

The Bus Arbiter State machine will snoop on the Bus_ Data bus during the RESPONSE state, and upon seeing the Hunt Request Signal, will transition to the HG-REQUEST state. During the HG-REQUEST state 01000, the arbiter may receive requests from each of the individual members of the identified hunt group which are available for connection. Each available NRCSM in the hunt group will issue an Arbitration Request Signal to the arbiter state machine via the Bus_Request bus 404. The lines are sampled on the rising edge of the clock during the 01000 state and a priority encoder inside the arbiter 402 chooses one hunt group node NRCSM to control the bus for the remainder of the hunt group arbitration cycle. If no NRCSM's in the hunt group are available, the arbiter state machine will transition back to the REQUEST state waiting for the next connection request from one of the NRCSMs.

In the event at least one NRCSM in the hunt group responds by issuing the Arbitration Request Signal, the arbiter will transition to the HG-GRANT state and will grant one "winning" NRCSM access to the data bus (Bus_Data bus 412) for the next clock cycle by issuing the appropriate NRCSM address ($00000_b$-$01111_b$ associated with $NRCSM_{0-15}$) on the Bus_Grant bus 410. The arbiter will thereafter transition back to the RESPONSE state 00100.

The winning node of the hunt group arbitration cycle will place a Grant Signal back on the data bus during the RESPONSE state indicating its own ID and that of the source node. Upon completion of the RESPONSE state, the Bus arbiter state machine will transition back to the REQUEST state 00000 waiting for the next connection sequence. In the preferred embodiment, the Grant Signal is a 16 bit word having source node and destination node ID information which corresponds to the requested configuration, or to an associated derived disconnect sequence. In particular, the 16-bit Grant Signal word asserted by the destination NRCSM on the data bus 412 includes first and second 5-bit node ID fields for identifying the destination and source nodes, respectively. In the event the destination NRCSM is busy, no Grant Signal is generated, resulting in no connection. The switch control state machine will disregard the first connection sequence issued by the source node's NRCSM in this situation, and no connection sequence will be issued to the switch matrix. The function of the switch control state machine 414 will be described in greater detail below.

NRCSM State Machine

Figure 6A:
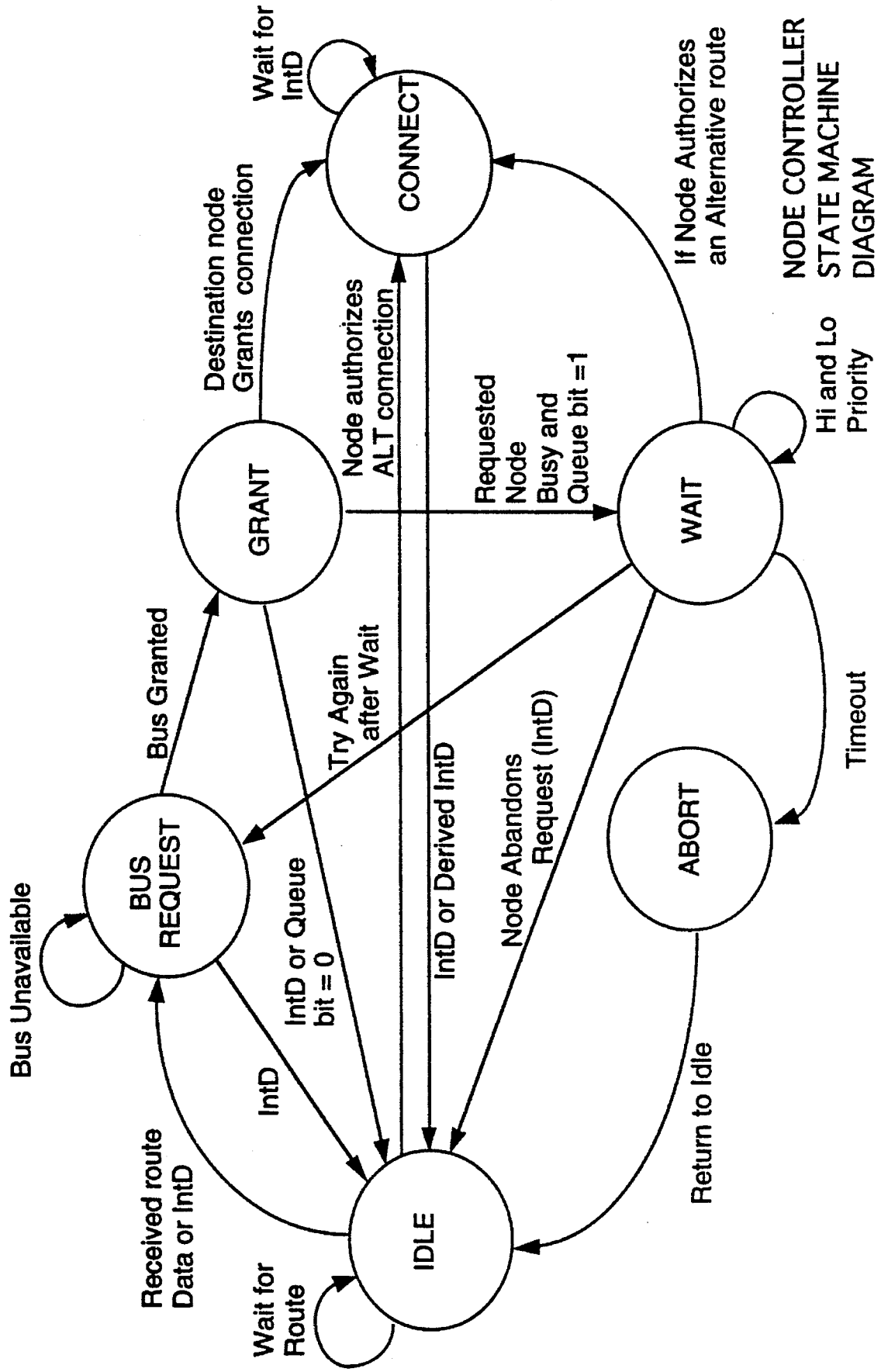
FIG. 6a shows the state machine diagram for a node route connect state machine according to the preferred embodiment of the present invention.

Referring now to FIG. 6a, a state diagram for each NRCSM is shown wherein six different states arise as the NRCSM processes requests from its associated transceiver. The NRCSM states are as follows:

IDLE. The NRCSM will remain in the idle state until either a valid connect sequence is received from the SAR in its associated transceiver via the connect output bus 210, or a disconnect flag is set for service on the disconnect output bus 212. The NRCSM always transitions from the IDLE state to the REQUEST state when initiating a connection. Alternatively, the NRCSM state machine may transition directly to the CONNECT state when it grants a connection from another requestor, or it wins a hunt group arbitration as an alternative path after a hunt group request has been generated by a "busy" destination node in its hunt group.

REQUEST. In this state, a connection or disconnection sequence has been received and the NRCSM must now signal the bus arbiter 402 (via the Bus_Request 404 bus) that it desires access to the data bus (Bus_Data bus 412). The NRCSM will check the status of the bus arbiter 402 via the Bus_State bus 408, and assert a request via the Bus_Grant 404 bus during the first arbitration cycle of the arbiter 402 (REQUEST state 00000). The NRCSM thereafter snoops on the Bus_Grant bus 410 for its own ID during the second arbitration cycle (GRANT state 00001 ), and if granted by the arbiter 402, the NRCSM advances to the GRANT state. If not granted, the NRCSM loops back to the REQUEST state until the next bus arbiter arbitration cycle for bus requests and tries again. This process is repeated until a GRANT is eventually authorized. In the preferred embodiment, the GRANT state may also be terminated by receiving a IntD disconnection signal from the source (requesting) node.

GRANT. In this state, the NRCSM has been granted the exclusive use of the data bus in order to issue a route request to other nodes and to receive their responses in return. The NRCSM places the 16 bit route request on the data bus and waits for a response. If the node to which the route request is placed is busy, then the NRCSM advances to the WAIT state. If the node to which the route request is placed is available, then the NRCSM advances to the CONNECT state. In the preferred embodiment, the NRCSM will wait a single clock cycle during a regular connection request in order to receive a response from the destination node. In the event the destination node requested is part of a hunt group, the NRCSM will wait 3 clock cycles to receive the response from one of the available members of a hunt group upon the unavailability of the initial destination node NRCSM. The operation of hunt groups and their effect on the arbiter clock cycles is described in greater detail below in conjunction with the hunt group state machine. A NRCSM will return to the IDLE state from the GRANT state if a disconnect signal is received on its disconnect output bus 212.

WAIT. In this state, the NRCSM has transitioned from the GRANT state due to destination unavailability. During this state the NRCSM evaluates the priority bit received in the 8 bit data request currently pending. In the preferred embodiment, if the priority bit is set, the NRCSM will wait 8 micro-seconds before retrying the request and transitioning back to the REQUEST state. If the priority bit is not set, the NRCSM will wait 64 micro-seconds, and then advance to the REQUEST state to retry the request. The NRCSM can timeout from this state and drop back to the ABORT state if a connection is not granted within a timeout period or transition back to the IDLE state upon receiving a disconnect request (IntD) via the disconnect output bus 212. Finally, the NRCSM may transition from the WAIT state to the CONNECT state upon accepting a request for connection initiated by another node and accordingly dropping its own pending connection.

ABORT. The abort state is entered into from the WAIT state caused by a timeout condition. In the preferred embodiment the timeout period is 1 millisecond, derived from the length of the first idle period between transmission of a connection request and data. In this way, the timeout will cause the NRCSM associated with a source node whose connection request has failed (i.e. data has been routed back to the source node upon the end of the first idle period), to return to the IDLE state waiting for the next connection request from its associated node. As indicated, upon a timeout the NRCSM advances back to the IDLE state.

CONNECT. The connect state indicates that the NRCSM has connected its associated node to another node. The connect state arises when the NRCSM advances from the GRANT state upon the acceptance of a route request by a destination node. Alternatively, a NRCSM in the IDLE state can advance to the CONNECT state upon recognizing and accepting a route request from another source NRCSM. This state can only be left by receiving a disconnect sequence (IntD) from the node itself, snooping a disconnect request by the node connected to the NRCSM's associated node, or by a timeout condition causing an internally generated disconnect request to be issued to both nodes. Upon exit, the NRCSM advances to the IDLE state.

Hunt Group State Machine

In the preferred embodiment, each NRCSM includes a Hunt Group State Machine (HGSM) 425. As such each NRCSM may be used in conjunction with a hunt group by programming the NRCSM with a hunt group ID. In the preferred embodiment, the hunt group state machine includes a register for storing the ID associated with the particular hunt group and may be programmed by manual switches on the NRCSM. Other means as known in the art may be used for programming the hunt group ID.

Figure 6B:
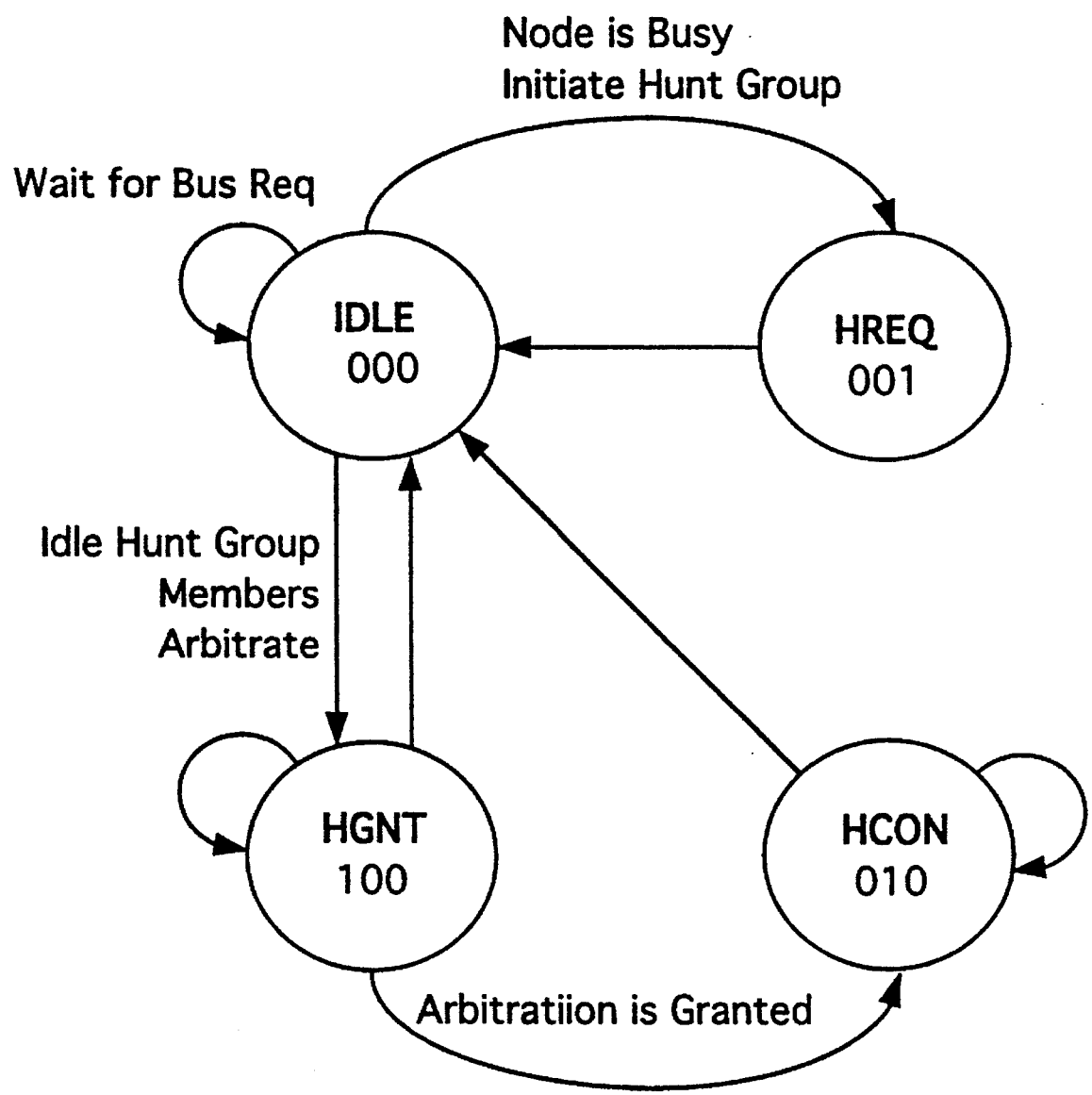
FIG. 6b shows the state machine diagram for a hunt group state machine according to the preferred embodiment of the present invention.

Referring now to FIG. 6b, a state diagram for each HGSM 425 in each NRCSM is shown. The HGSM 425 has four different states associated with hunt group requests processed by a NRCSM in a respective hunt group. The Hunt Group states are as follows:

IDLE. The IDLE state is a wait state for a hunt group request. The HGSM of a "busy" hunt group node will transition from the IDLE state to the HREQ state upon identifying its own address as the destination of a connection request issued during the COMMAND state of the arbiter 402 by a source node NRCSM. For all other nodes in a hunt group, the HGSM for each respective node will remain in the IDLE state snooping on the Bus_Data bus 412 until it detects a Hunt Request Signal generated by one of the members of its own hunt group during the RESPONSE state of the arbiter 402, and thereafter transition to the HGNT state. The HGSM always transitions from the IDLE state to the HREQ state if it is a "busy" destination of a connection request. Alternatively, the HGSM state machine will transition directly to the HGNT state when it is an available member of the hunt group requested by another "busy" destination in the same hunt group.

HREQ. In this state, a connection has been received, however the node associated with this NRCSM is already busy. During this state, the HGSM signals the other members of its hunt group by issuing a Hunt Request Signal identifying the source node ID, priority, data, and queue information as well as the Hunt Group ID. The busy destination node HGSM transitions back to the IDLE state from the HREQ state.

HGNT. In this state, a NRCSM in the designated hunt group (as designated by the Hunt Request Signal) which is available for traffic will issue an Arbitration Request Signal to the arbiter 402 via the Bus_Request bus, requesting that the arbiter grant it access to the Bus_data bus 412 so as to service the pending connection request which was unable to be serviced by the other "busy" hunt group member. If the arbiter does not grant the arbitration request, the HGSM will transition back to the IDLE state. If the arbiter grants the arbitration request indicating the associated NRCSM has been granted the exclusive use of the data bus for the next clock cycle in order to service the pending route request from the source node, the HGSM will transition to the HCON state.

HCON. The connect state indicates that the "winning" NRCSM has successfully arbitrated for the Bus_data bus 412 and may issue a Grant Signal. During this state the "winning" HGSM issues the Grant Signal on the Bus_data bus 412 indicating its own ID, as well as the source ID so as to allow completion of the connection request. In the preferred embodiment, the HGSM stays in the HCON state until a disconnection sequence is received. In an alternative embodiment, the HGSM returns from the HCON state to the IDLE state upon completion of the connection of its associated node to another node.

Switch Controller State Machine

Figure 7:
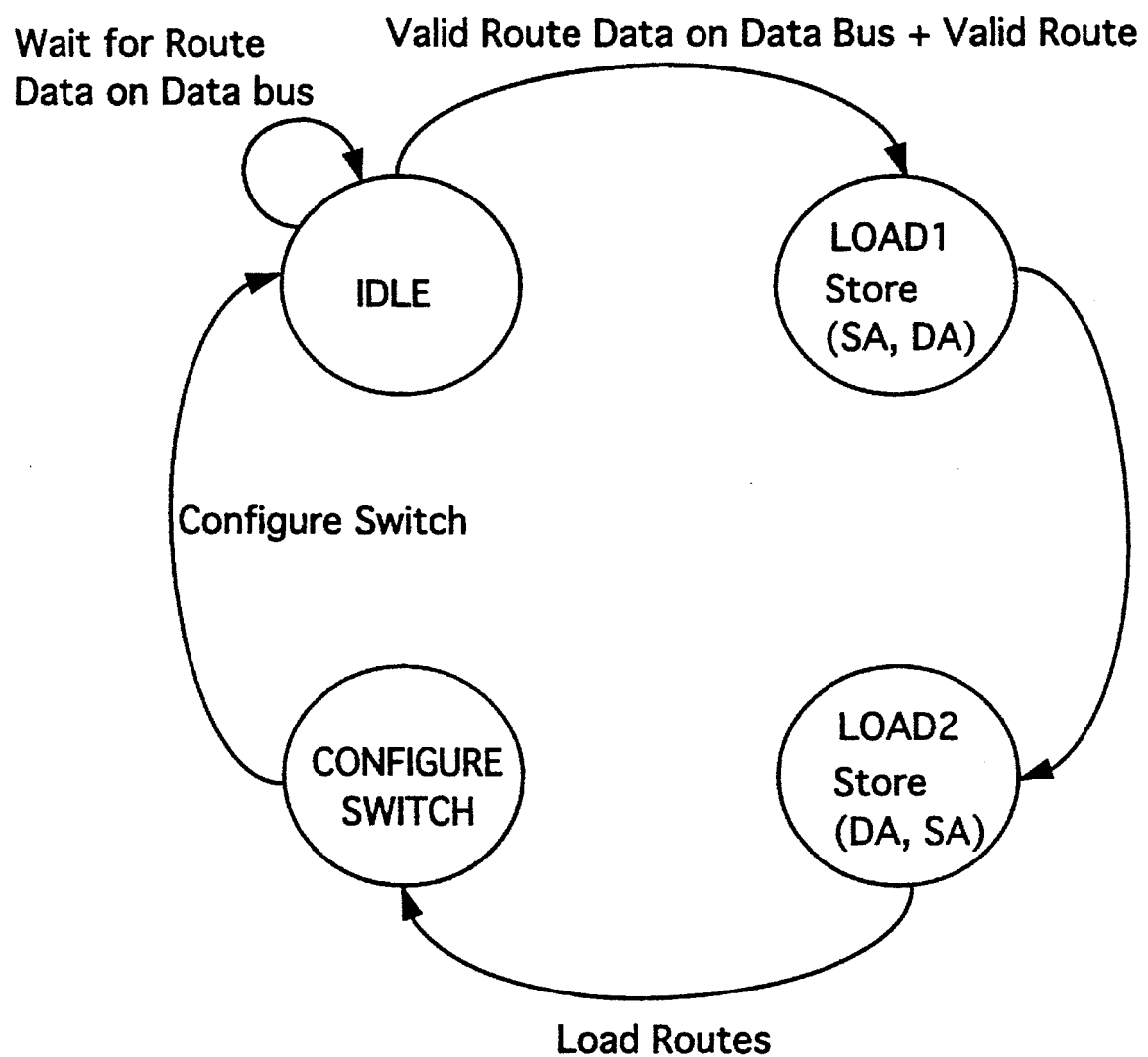
FIG. 7 shows the state machine diagram for a switch controller state machine according to the preferred embodiment of the present invention.

Referring now to FIG. 7 a state diagram for the switch controller state machine 414 is shown. The switch controller state machine 414 transitions among four different states as the various routing requests are processed by the bus architecture described above. The switch controller state machine 414 states are:

IDLE. The switch controller state machine monitors the data bus (Bus_Data bus 412) for connect and disconnect sequences. Upon identifying and buffering a completed connection sequence on the data bus, the switch controller state machine advances to the LOAD1 state.

LOAD1. The switch controller state machine loads the first route request to the matrix switch in the form of a node to node connection, or a node disconnection (e.g., loading the source and destination ID information from the data word on the data bus for a connection request [source node A→destination B, requesting that a connection be made between A and B], or a disconnection request [source A→destination A, requesting that node A be returned to loopback]). The switch controller state machine advances to the LOAD2 state after this load is completed.

LOAD2. The switch controller state machine 414 loads the second route request (i.e., the node ID values on the arbiter data bus 412 during the arbiter's RESPONSE state) to the matrix switch in the form of a node to node connection, or a node disconnection (e.g., loading the source and destination ID information from the data word on the data bus for a granted connection request [source B→destination A] indicating that the destination node has authorized this connection, or any derived disconnection requests [source B→destination B, derived if A had been previously connected to B as indicated by a node B snoop of the data bus "seeing" the requested disconnect by node A]). The switch controller state machine 414 advances to the CONFIGURE state upon receiving the second load.

CONFIGURE. The switch controller state machine 414 then forces both new switch states to become activated by issuing a configuration strobe and the authorized connection requests to the matrix switch via the switch controller 114. As the switch controller state machine advances through these states it also updates the switch configuration shadow table 418 with the new matrix configuration simultaneously with the issuance of the matrix configuration commands from its sequencer 416. The switch controller state machine then returns to the IDLE state, snooping on the data bus (Bus_Data bus 412) for new connection and disconnection requests.

Examples of Switch Operations

Referring back to FIG. 4, typical operations will be described in accordance with the preferred embodiment of the present invention (route request operation, route disconnect operation, queued request, and data transfer to (or from) the core micro controller). Assuming for the purposes of these examples, that the matrix switch is configured with all 16 nodes 102 in loopback unless otherwise stated.

Figure 8A:
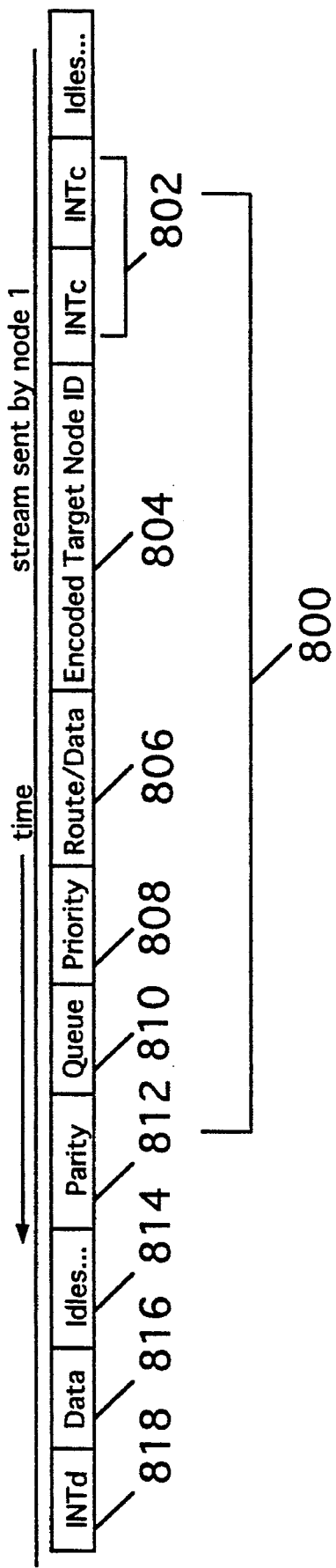
FIG. 8a shows a data structure generated by a source node for establishing connection to a destination node.

NODE1 request for connection to NODE2. Referring to FIG. 8a, the data structure for making a point to point connection between nodes is shown. FIG. 8a details the sequence of commands and data generated by a source node (NODE1) necessary to establish a communication link, transmit data and close the link with a destination node (NODE2). In order to create the connection, the source node (NODE1) would generate a connection sequence 800, also called the blind interrogation data format or protocol, for transmission to its associated transceiver 104 indicating that a connection was desired to a destination node (NODE2). NODE1 would generate a connection sequence for encoding including two start bits 802 (10), followed by the destination node ID 804 (NODE2 in this case, resulting in a next five bits 00010), a route/data bit 806 set for route(1), a priority bit 808 set as desired (1 for the purposes of our example), a queued bit 810 (0 for the purposes of this example) and a parity bit 812 (1 set for this example). This binary data sequence (10000101101) is thereafter encoded by the source node to yield a connection sequence comprising eleven words for transmission to the transceiver $104_1$ connected to NODE1. For this example the connection sequence would be an eleven word sequence of connect words (IntC) and neutral words (IntN) as follows: IntC, IntC, IntN, IntN, IntN, IntC, IntC, IntC, IntN, IntC, IntC. NODE1 generates a first idle sequence 814 for transmission to the switch controller during the processing period for the connection sequence.

Upon receiving the connect sequence from NODE1, the SAR in transceiver $104_1$ would output to NRCSM $400_1$ a decoded 8 bit data word indicating the destination node, route/data status, priority, and queue information via the connect output bus $210_1$. Upon receipt of the valid connection request, NRCSM $400_1$ would transition from the IDLE state to the REQUEST state and assert a request to the arbiter 402 upon the next bus request cycle of the of the arbiter 402 (during the REQUEST state of arbiter 402). As was described above, the NRCSM $400_1$ would seek access to the bus until the timeout period expired or a connection was established. Upon receiving a bus grant acknowledgment from the bus arbiter 402, the NRCSM $400_1$ places a 16 bit mute request on the data bus (Bus_Data bus 412) indicating its own ID, the destination ID (NODE2), route/data status, queued status, and priority.

The switch controller state machine 414 snoops the data bus and stores the first load of route information and transitions to the LOAD1 state.

All of the NRCSMs snoop the data bus, and as such the NRCSM $400_2$ associated with NODE2 would also see the request placed on the data bus by NODE1. Accordingly, the NRCSM $400_2$ would verify through its own configuration log 424 that it is available, and as such, would place onto the data bus (Bus_Data bus 412) during the next clock cycle (i.e., the arbiter RESPONSE state) a 16 bit Grant Signal indicating its own ID, the destination ID (NODE1), route/data status, queued status, and priority. The NRCSM $400_2$ would thereafter transition to the CONNECT state and update its configuration log accordingly to reflect the connection to NODE1.

The NRCSM $400_1$ associated with NODE1 would snoop on the data bus during the RESPONSE cycle, and upon seeing the response form NODE2 would transition to the CONNECT state and similarly update its configuration log. If no response was seen, then the NRCSM would transition to the WAIT state, ultimately either re-requesting the route or terminating the request upon the expiration of the timeout period.

Assuming an authorization was generated by the destination node during the RESPONSE cycle, the switch controller state machine stores a second connection sequence upon seeing the authorized connection sequence from NODE2 on the data bus (transitioning to the LOAD2 state). The switch controller state machine would then advance to the CONFIGURE state and evaluate the pending request as a valid connection request. The switch controller state machine would thereafter generate a connection sequence (using sequencer 416) for transmission to the switch matrix switch controller 114 for the NODE1 to NODE2 connection and update the switch configuration shadow register 418.

At this point each of the NRCSMs for NODE1 and NODE2 would be in the CONNECT state. The arbiter and the switch controller state machine would return to the IDLE state waiting for the next connection or disconnection request.

At the end of the first idle period 814, the source node (NODE1) would begin to transmit payload data 816 assuming the connection was made with the destination node. If the connection request was successfully processed, then the payload data will be routed to the destination node via the switch matrix. If however the destination node was busy, the payload data 816 will be routed back to the source node via the loopback connection in the switch matrix. At this point the requesting source node may abandon its attempt to communicate with the destination node or it may generate a queued request as discussed below. Assuming a successful connection was established, the transmission of data will terminate with a disconnection request 818, signalling the end of the communication link between the source and the destination node.

For the purposes of this document, the terms "payload data" and "user data" are used interchangeably to mean the data in a transmitted data stream other than the connect sequence 800 and disconnect request 818. In other words, the payload or user data 816 is the message that the transmitting node is attempting to transmit to a destination node, while the connect sequence 800 and disconnect request 818 are "overhead" signals required for use of the network switches and thus are not part of the "payload."

NODE2 request for disconnection to NODE1. In order to reconfigure the matrix switch for loopback, NODE2 (or NODE1) can generate a disconnection sequence (IntD) for transmission to its associated transceiver 104 indicating that a disconnection was desired from NODE1 (or NODE2). NODE2 would generate an disconnection sequence comprising the disconnect word (IntD) for transmission to the transceiver $104_2$ connected to NODE2.

Upon receiving the disconnect sequence from NODE2, the transceiver $104_2$ sets a flag for service by NRCSM $400_2$ via the disconnect output bus 212. Upon receipt of the valid disconnection request, NRCSM $400_2$ would transition from the CONNECT state to the IDLE state and assert a request to the arbiter 402 upon the next bus request cycle of the of the arbiter 402 (during the REQUEST state of arbiter 402). Upon receiving a bus grant acknowledgment from the bus arbiter 402, the NRCSM $400_2$ places a 16 bit disconnect request on the data bus (Bus_Data bus 412) indicating its own ID as source and destination, mute/data status, queued status, and priority. The NRCSM $400_2$ would thereafter transition to the IDLE state and update its configuration log accordingly to reflect a loopback connection.

The switch controller state machine 414 snoops the data bus and would perform the first load of route information by transitioning to the LOAD1 state, thereby loading the disconnect sequence from NODE2 (NODE2→NODE2).

All of the NRCSMs snoop the data bus, and as such the NRCSM $400_1$ associated with NODE1 would also see the disconnect request placed on the data bus by NODE2. Accordingly, the NRCSM $400_1$ would request the data bus from the arbiter during the next request cycle. Upon being granted the data bus, the NRCSM $400_1$ would assert onto the data bus (Bus_Data bus 412), during the arbiter RESPONSE state, a 16 bit disconnect request indicating its own ID as a source and destination, route/data status, queued status, and priority. The NRCSM $400_1$ would thereafter transition to the IDLE state and update its configuration log accordingly to reflect a loopback connection.

Finally, during the RESPONSE cycle, the switch controller state machine would transition to the LOAD2 state and perform the second load. The switch controller state machine would then advance to the CONFIGURE state and evaluate the pending request as a valid disconnection request. The switch controller state machine would thereafter generate a connection sequence by the sequencer 416 for transmission to the switch matrix switch controller 114 for the NODE1 to NODE1 and NODE2 to NODE2 connection and update the switch configuration shadow register 418.

At this point each of the NRCSMs for NODE1 and NODE2 would be in the IDLE state. The arbiter and the switch controller state machine would also be in the IDLE state waiting for the next connection or disconnection request.

Figure 8B:
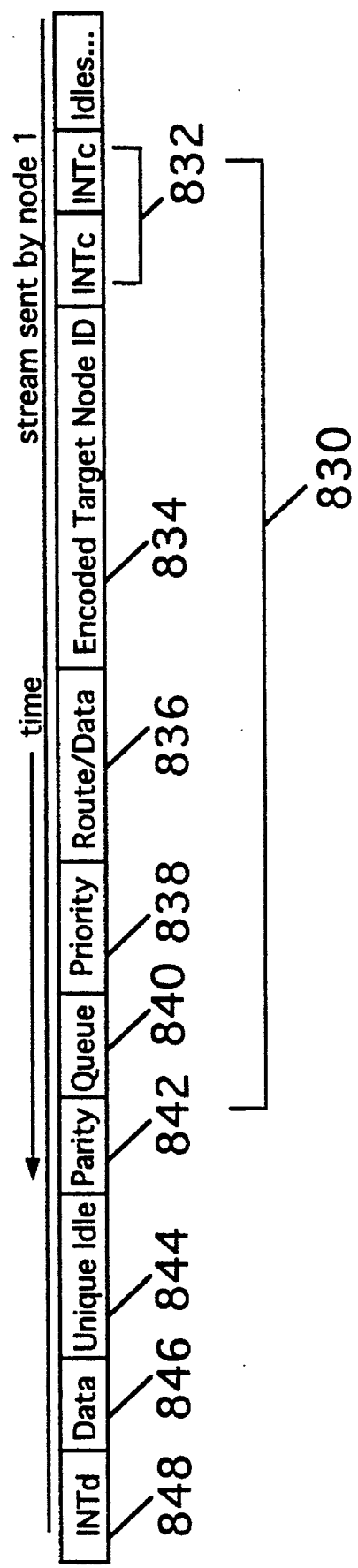
FIG. 8b shows a data structure generated by a source node for queuing a connection request for establishing a link to a destination node which was previously busy.

NODE1 queued request for connection to NODE2 assuming Destination is presently unavailable. Referring to FIG. 8b, the data structure for queuing a request to establish a point to point connection between nodes is shown. FIG. 8b details the sequence of commands generated by a source node (NODE1) necessary to establish a communication link with a destination node (NODE2), assuming that an initial communication request was not granted. In order to create the connection, the source node (NODE1) would generate a connection sequence 830 for transmission to its associated transceiver 104 indicating that a queued connection request was desired to a destination node (NODE2). NODE1 would generate a connection sequence for encoding including two start bits 832 (10), followed by the destination node ID 834 (NODE2 in this case, resulting in a next five bits 00010), a route/data bit 836 set for route(1), a priority bit 838 set as desired (1 for the purposes of our example), a queue bit 840 (set to 1 indicating the queued request) and a parity bit 842 (0 set for this example). This binary data sequence (10000101110) is thereafter encoded by the source node to yield a connection sequence comprising eleven words for transmission to the transceiver $104_1$ connected to NODE1. For this example the connection sequence would be an eleven word sequence of connect words (IntC) and neutral words (IntD) as follows: IntC, IntC, IntN, IntN, IntN, IntC, IntC, IntC, IntN, IntN, IntC.

One difference in the queued mode involves the idle sequence generated during the wait period for connection. In an ordinary request, the idle sequence can be any arbitrary sequence, and is not analyzed by the source node. As was described above, the source node begins to source data upon the termination of a predetermined amount of time, irrespective of the switch configuration. In the queued mode, the source node must be able to recognize when a valid connection has been made. Accordingly, during the idle period while the switch matrix is attempting to make the queued connection, the source node must generate a recognizable idle, which is distinguishable from any information which would be received upon the connection being granted. In the preferred embodiment, each node will generate a unique idle, associated with the wait state for a queued request, that is different from any idle that would be received from any other node after the completion of the queued connection. For the purposes of our example, NODE1 generates a unique idle sequence 844 for transmission to the switch controller during the processing period for the connection sequence.

Upon receiving the connect sequence from NODE1, the SAR in transceiver $104_1$ would output to NRCSM $400_1$ a decoded 8 bit data word indicating the destination node, route/data status, priority, and queue information via the connect output bus $210_1$. Upon receipt of the valid connection request, NRCSM $400_1$ would transition from the IDLE state to the REQUEST state and assert a request to the arbiter 402 upon the next bus request cycle of the of the arbiter 402 (during the REQUEST state of arbiter 402). In the queued mode, the NRCSM $400_1$ would seek access to the bus until a connection was established or until a disconnect sequence was received from the source node. Upon receiving a bus grant acknowledgment from the bus arbiter 402, the NRCSM $400_1$ places a 16 bit route request on the data bus (Bus_Data bus 412) indicating its own ID, the destination ID (NODE2), route/data status, queued status, and priority.

The switch controller state machine 414 snoops the data bus and stores the first load of route information by transitioning to the LOAD1 state.

All of the NRCSMs snoop the data bus, and as such the NRCSM $400_2$ associated with NODE2 would also see the request placed on the data bus by NODE1. Accordingly, the NRCSM $400_2$ would verify through its own configuration log 424 that it is available, and as such, would place onto the data bus (Bus_Data bus 412) during the next clock cycle (i.e., the arbiter RESPONSE state) a 16 bit Grant Signal indicating its own ID, the destination ID (NODE1), route/ data status, queued status, and priority. The NRCSM $400_2$ would thereafter transition to the CONNECT state and update its configuration log accordingly to reflect the connection to NODE1.

The NRCSM $400_1$ associated with NODE1 would snoop on the data bus during the RESPONSE cycle, and upon seeing the response form NODE2 would transition to the CONNECT state and similarly update its configuration log. If no response was seen, then the NRCSM would transition to the WAIT state, ultimately either re-requesting the route or terminating the request upon receipt of a disconnect signal from the source node.

Upon the availability of the destination node, the switch controller state machine will transition to the LOAD2 state and store a second connection sequence and thereafter generate a connection sequence (using sequencer 416) for transmission to the switch matrix switch controller 114 for the NODE1 to NODE2 connection and update the switch configuration shadow register 418.

At this point each of the NRCSMs for NODE1 and NODE2 would be in the CONNECT state. The arbiter and the switch controller state machine would return to the IDLE state waiting for the next connection or disconnection request.

During the processing of the connection request, the source node (NODE1) continuously generates and receives (via the loopback) its unique idle pattern 844. Upon the completion of the connection, the source node will no longer receive its unique idle, thereby signalling a connection has been granted, and indicating that data 846 may now be transmitted from the source node to the destination node. Assuming a successful connection was established, the transmission of data will terminate with a disconnection request 818, signalling the end of the communication link between the source and the destination node.

Transmitting Switch Diagnostics to Node1. Transmission of data by the controller core 422 to the nodes 102 is performed via the diagnostics signal lines 207. In particular, a node can request diagnostics data from the controller core 422 by sending an eleven word connect sequence to the switch 100 in which the route/data bit flag is set to the "data" value and the 5-bit "destination node ID" is set to a predefined diagnostics request command value, such as "11110." After sending that command, the source node 102 continually transmits a fixed signal pattern, preferably the neutral 1010... sequence, until all the requested diagnostics data has been received by the source node. In addition, upon sending the diagnostics request command, the source node commands its host adapter to decode data patterns superimposed on top of the transmitted fixed signal pattern and to thereby recover diagnostics data transmitted to it by the switch's controller core 422.

When the hub controller 420 detects the data flag and diagnostics request command on the Bus_Data bus 412, it prompts the controller core 422 to perform a self-diagnostics procedure and to transmit a packet of diagnostics data to the source node. To transmit the diagnostics data to the source node, the controller core 422 enables one of sixteen transceiver diagnostics chip select lines, and then transmits diagnostic data to the selected transceiver via the diagnostic port's inbound serial line. The diagnostics data is transmitted at a relatively slow rate, such as a rate between 1,000 and 10,000 bits per second, by the selected transceiver 104 by turning its transmitter on and off so as to superimpose a data pattern on top of the fixed signal pattern that is being transmitted by the source node 102 through the switch 100 and back to itself. The source node's host adapter detects the on/off sequence superimposed on the fixed signal pattern and thereby decodes and recovers the transmitted diagnostics data packet. The diagnostics data packet has a predefined fixed length, such as 1024 or 2048 bits, and when the source node has received that much data, it's host adapter is commanded by the associated node to resume its normal mode of operation.

Systems Having Multiple Switches

Figure 9A:
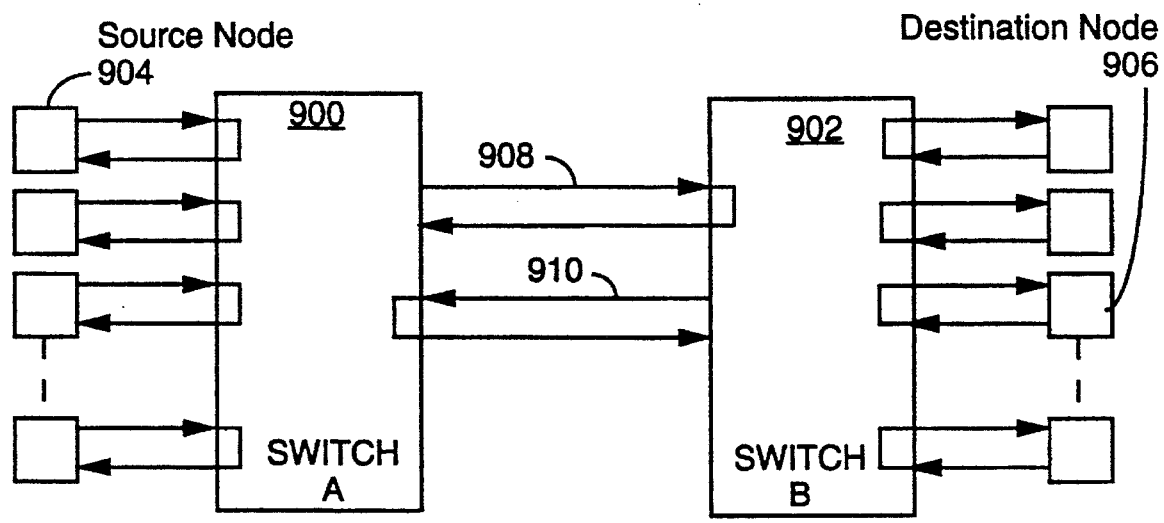
FIG. 9a shows a multi-switch configuration implemented by interconnecting a pair of switching devices according to the preferred embodiment of the present invention.

Referring now to FIG. 9a, a second embodiment of the present invention is shown including two switching apparatus 900 and 902. The basic network of nodes and a single switch can be extended to include multiple switches where links exist between switches as well as between "subscriber" nodes and switches. In the preferred embodiment, two links are used between each pair of switches. However, it would be possible to link a pair of switches with a single link, understanding that only a single connection between the switches could be maintained at any time. For the purpose of explanation, we Will designate switching apparatus 900 as switch A and switching apparatus 902 as switch B. Switch A is configured such that two links are oriented to flow traffic to or receive traffic from switch B. Switch B is configured in a complementary manner again utilizing two links of the switch matrix to allow for two communication links between switch A and switch B.

The protocol for requesting a connection between a node connected to switch A and a node connected to switch B is a simple extension of the basic network whereby two routing sequences precede data that is to be transferred between a source node and a destination node. In the basic network described previously, a routing sequence is encoded and transmitted requesting a particular destination node for connection to the source node that is processed by the control electronics 116 of the switching apparatus 100. In this embodiment, one master node holds the information associated with the switch configuration. Accordingly, a user may request information from the master node as to the configuration of switch A. This information may be requested, much as any other request for connection of the two nodes in a point to point communication link. The switch configuration is assumed to be accurate over time periods larger than a few milliseconds. Therefore, this information does not actually represent the switch state, but rather the nodes attached to each switch that are generally available for traffic. Those ordinarily skilled in the art will recognize that in a multi switch configuration, the source node must recognize which port of the switch matrix and associated transceiver is coupled between the switch A and switch B devices or utilize "hunt groups". In the preferred embodiment, hunt groups are utilized.

In the preferred embodiment, each NRCSM may be programmed as part of a hunt group. Typically, a hunt group is a series of nodes which are coupled between the switches in a multiple switch configuration which are interchangeable (i.e. all the members of a hunt group are connected to the same destination (switch)). In this way, a source node, which merely desires connection between a given pair of switches and does not care how this connection is achieved, may request a single destination address (for the hunt group) and the hunt group will assign one of the available nodes of the group to complete the connection. For purposes of clarity, a hunt group request will be described in greater detail in association with the various state machines utilized in the preferred embodiment of the present invention.

Figure 9B:
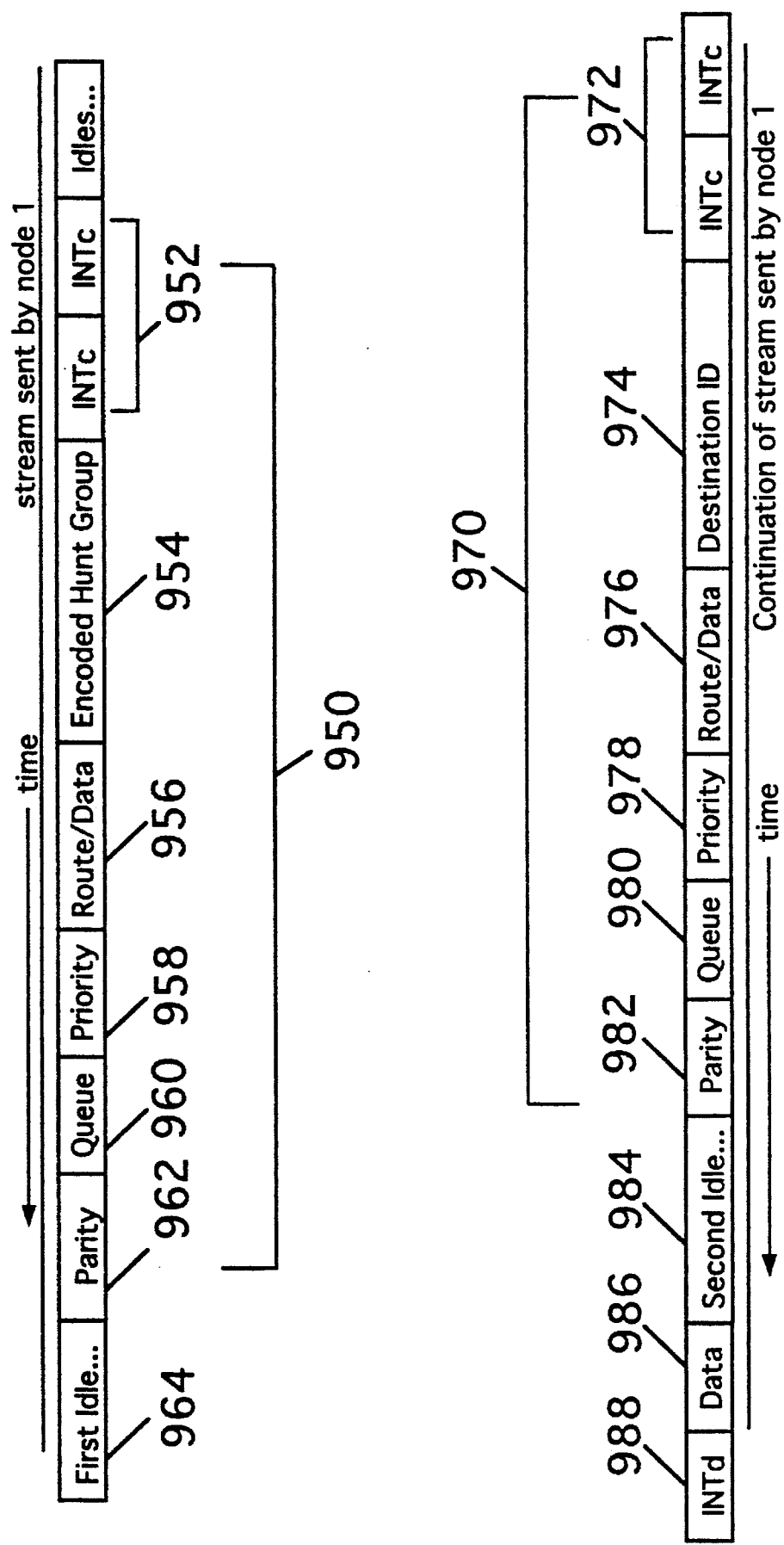
FIG. 9b shows a data structure generated by a source node for establishing connection to a destination node in a multi switch configuration.

NODE1 (at switch matrix A) request for connection to a hunt group so as to allow any available connection to NODE2 (at switch matrix B). Referring to FIG. 9b, the data sequence generated by a source node including a hunt group destination for making a connection to a node connected to a remote switch is shown. In order to initiate communication between a source node 904 and a destination node 906 which is connected to switch B, the source node 904 will issue a first connect sequence 950 comprising two start bits 952, the ID for a hunt group node (which may be the node ID of any member designated in a hunt group) 954 connected between switch A and switch B, along with route/data 956, priority 958, queue 960 and parity 962 information. After the transmission of the first connection sequence 950, the source node sits in a first idle period 964, waiting for the switch matrix to process the first connection request.

The NRCSM associated with the source node processes the connection request to the hunt group node just as any other connection request. The source node NRCSM issues a bus request to the arbiter 402, and upon the grant of the Bus_data bus 412, issues the connection request during the COMMAND state of the arbitration cycle.

The hunt group node designated by the connection request will determine if it is busy and if not service the connection request by issuing a Grant Signal during the RESPONSE cycle as described above. Alternatively, if the hunt group node designated by the connection request is busy, the HGSM associated with the busy hunt group node will issue a Hunt Request Signal on the Bus_data bus 412 during the RESPONSE cycle.

Figure 10:
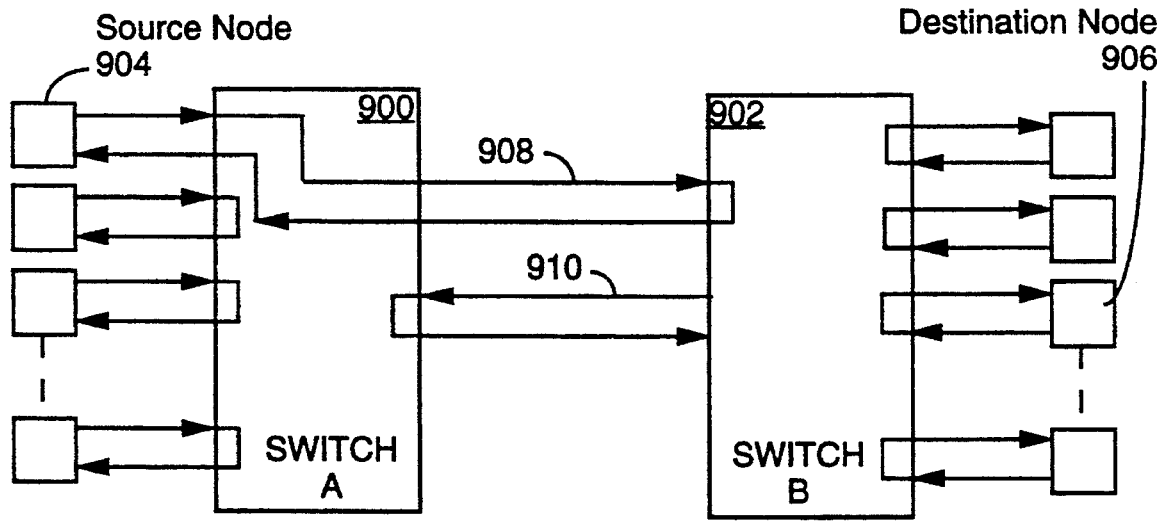
FIG. 10 shows a multi-switch configuration after a first connection request has been serviced by an interfacing switch.

As described above, the remaining members of the hunt group associated with the "busy" hunt group node will snoop on the Bus_data bus during the RESPONSE cycle looking for the ID of their respective hunt group. Similarly, the arbiter 402 will snoop on the data bus and upon recognizing the Hunt Request Signal, will transition to the HREQ state. Thereafter, each available member of the hunt group will arbitrate to receive control over the data bus to service the pending connection request. The arbiter 402 in switch matrix A will designate one of the available hunt group nodes as the "winner" of the arbitration, whereupon the winning hunt group node will assert its own ID as well as that of the source (requesting) node back on the data bus during a second RESPONSE state allowing for the completion of the outbound connection to switch matrix B. Upon processing the first connect request, switch A will be configured such that a link exists between the source node 904 and switch B via the a traffic link 908 as is shown in FIG. 10.

Figure 11:
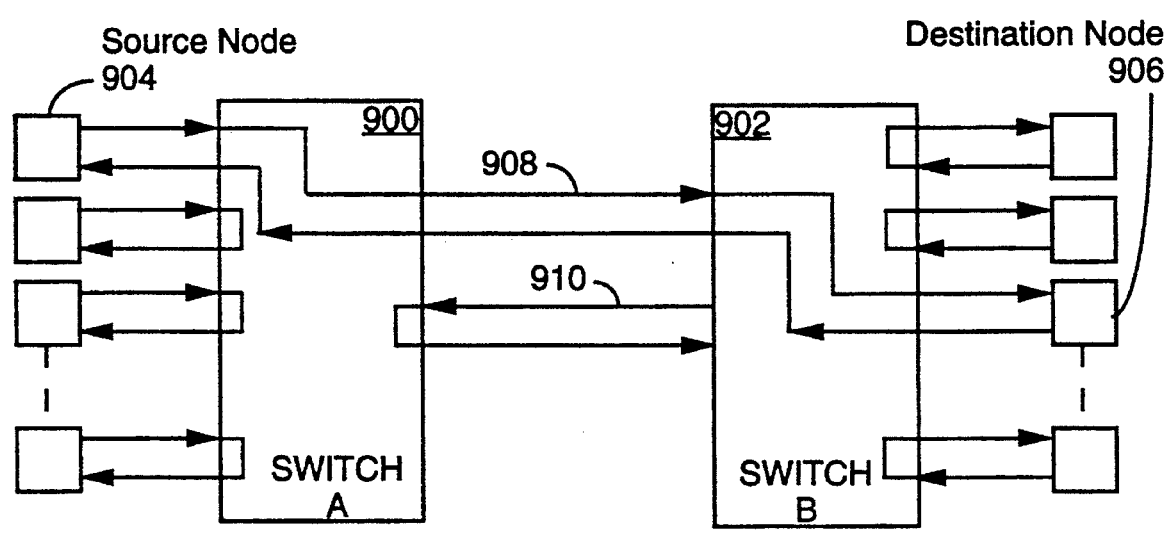
FIG. 11 shows a multi-switch configuration after a second connection request has been serviced thereby allowing for full duplex communication between nodes connected to different switches.

At the end of the first idle period 964, the source node will assume that the connection through switch A has been completed and will generate a second connection sequence 970. The second connection sequence 970 comprises two start bits 972, the ID 974 for the destination node connected to switch B, along with route/data 976, priority 978, queue 980 and parity 982 information. The second connect request will be ignored by Switch A's NRCSM since the switch NODE is already in the CONNECT state. After the transmission of the second connection sequence 970, the source node sits in a second idle period 984, waiting for the switch matrix to process the second connection request. Switch B processes the second connection sequence 970, and either grants or denies access as described above. After the second idle period ends, the source node begins to transmit data 986 assuming the switch configuration has been completed. Just as was described previously, upon receipt of the data 986 back at the source node, the source is able to determine if the connection has failed. Upon the completion of the data transmission, a disconnect sequence 988 can be generated by the source (or destination) which will yield a breakdown of the communication link. Upon the availability of the destination node 906, a link will be established between source node 904 and destination node 906 as shown in FIG. 11. Just as was described above, any source node which is connected to switch B may request connection to a destination node connected to switch A in a similar fashion utilizing either link between switch B and switch A for traffic originating at switch B.

The multiple switch configuration works equally well with either the normal mode for connection requests and the queued mode. In the normal mode, the switch will assume a first connection has been made, and upon the expiration of a idle period, automatically generate the second connect request. In the event that the switch connection has not been completed, the switch matrix will see its first second request returned. However, at this point the user (i.e., the node transmitting the connection request) will not know if this loopback occurred at the local switch (the switch to which it is connected) or if the loopback occurred at the remote switch. In the preferred embodiment, the user waits a second idle period, and upon the expiration of the second idle period, begins to transmit data assuming that a connection has been made. In this configuration, if the user data is looped back, one of the two connections failed. At this point the user may terminate the request process or choose to generate a queued request. Those ordinarily skilled in the art will recognize that the exact switch failure location (either local or remote) may be simply determined by examining or marking the data sent to the switching matrixes. However, in the preferred embodiment, no marking is performed in order to alleviate on overhead, opting for the user to merely re-request a connection without providing diagnostic information back to the user on which exact connection failed.

The queued mode may be implemented in a multiple switch environment as described previously. The only additional feature required is a means for timing the receipt of the unique idles so as to establish when the connection through the local switch is complete. In the preferred embodiment, a detector is used to track the receipt of unique idles, and upon a break (signalling that the idle has now been looped back through a longer path via the remote switch) initiating the transmission of the second connect sequence form the source node.

Figure 9C:
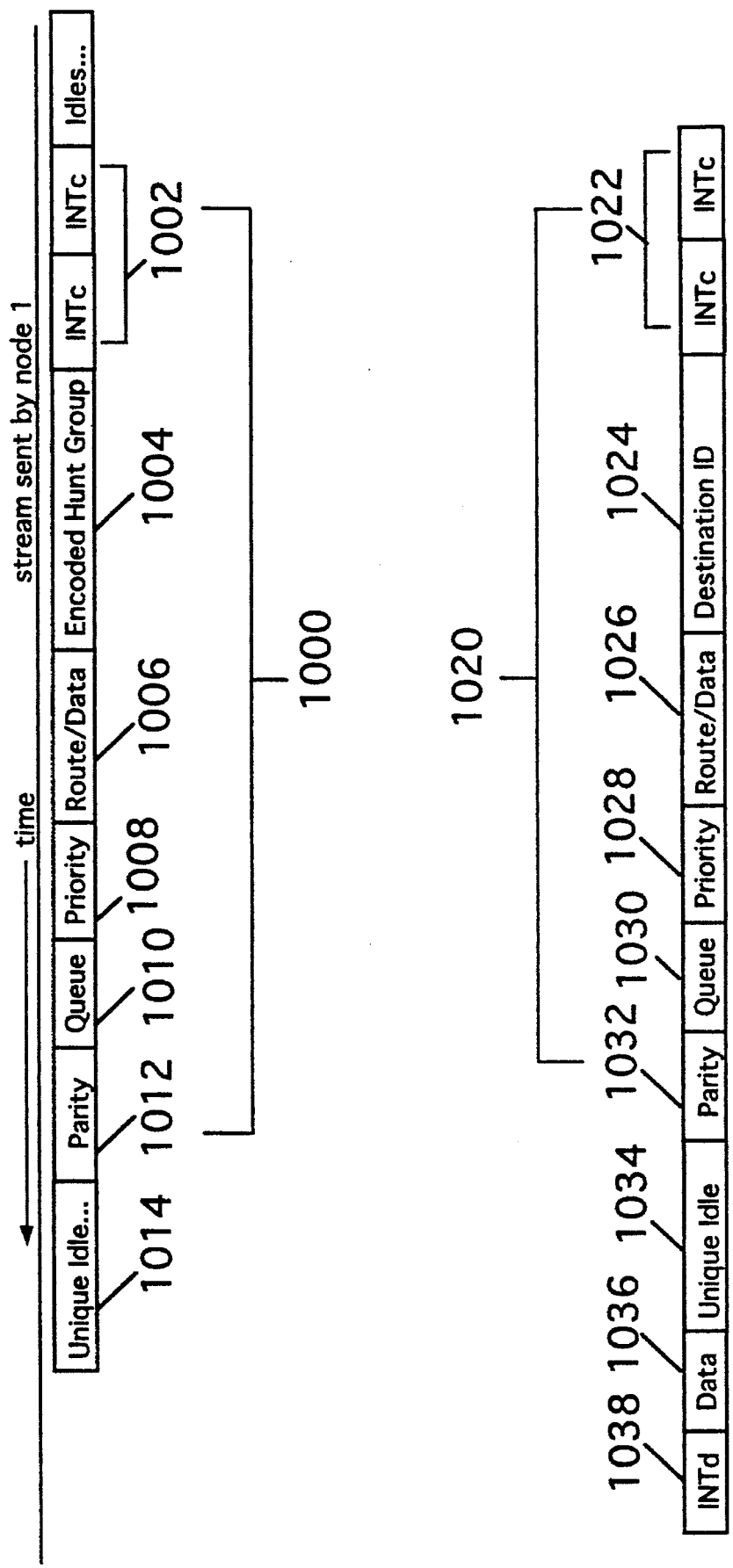
FIG. 9c shows a data structure generated by a source node for queuing a connection request for establishing a link to a destination node which was previously busy.

Referring to FIG. 9c, the data sequence generated by a source node for requesting a queued connection request is shown. In order to initiate communication between a source node 904 and a destination node 906 which is connected to switch B which previously was busy, the source node 904 will issue a first connect sequence 1000 comprising two start bits 1002, an ID for one member in the hunt group 1004 connected between switch A and switch B, along with route/data 1006, priority 1008, queue 1010 (set to 1) and parity 1012 information. After the transmission of the first connection sequence 950, the source node generates a unique idle 1014, waiting for the switch matrix to process the first connection request. Switch A will attempt to processes the first connection sequence 1000, disabling the timeout feature, and will continue to attempt to make the first connection until it is made or until the source node generates a disconnect sequence (IntD). Upon processing the first connect request, switch A will be configured such that a link exists between the source node 904 and switch B via the A traffic link 908 as is shown in FIG. 10.

Upon the successful completion of the first connection, the source node will generate a second connection sequence 1020 comprising two start bits 1022, the ID 1024 for the destination node connected to switch B, along with mute/data 1026, priority 1028, queue 1030 (set to 1) and parity 1032 information. The second connect request will be ignored by Switch A's NRCSM since the switch NODE is already in the CONNECT state. After the transmission of the second connection sequence 1020, the source node again transmits its unique idle 1034, waiting for the switch matrix to process the second connection request. Switch B processes the second connection sequence 1020, and either grants or denies access as described above. Upon the successful completion of the second connection request, the source node begins to transmit data 1036 knowing the switch configuration has been completed. Upon the completion of the data transmission, a disconnect sequence 1038 can be generated by the source (or destination) which will yield a breakdown of the communication link. Upon the availability of the destination node 906, a link will be established between source node 904 and destination node 906 as shown in FIG. 11.

Figure 12:
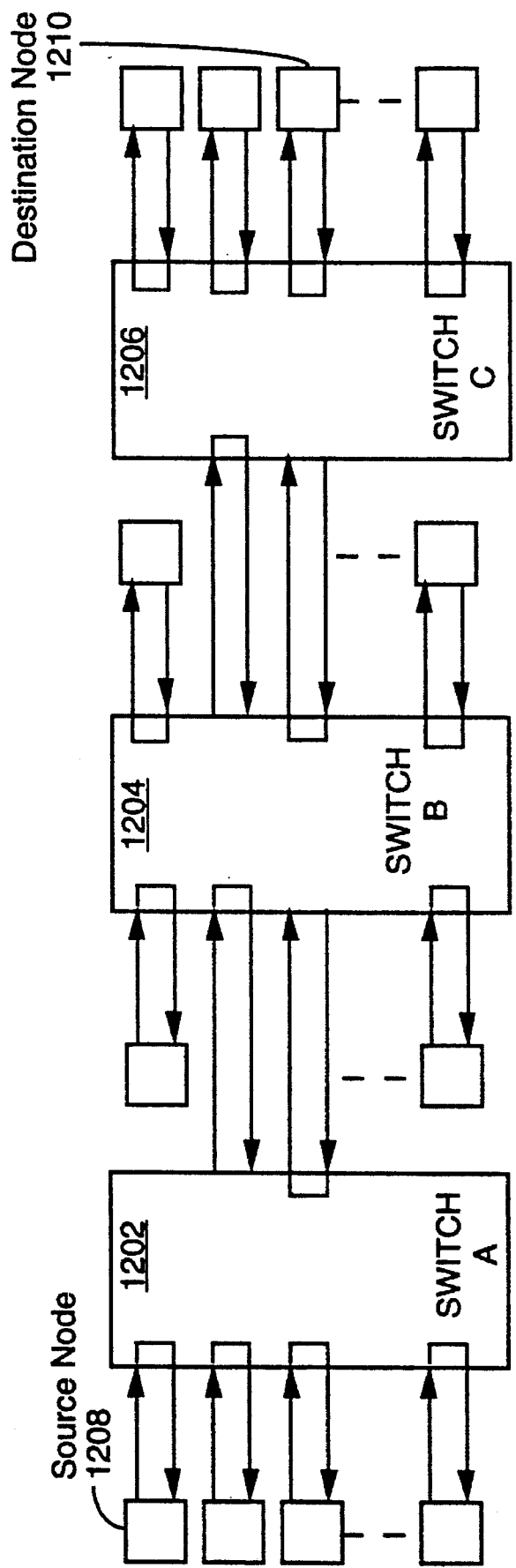
FIG. 12 shows a three switch configuration utilizing three switches according to the preferred embodiment of the present invention.

Referring now to FIG. 12, a three switch configuration is shown. In the three switch configuration, again, each switch 1202, 1204 and 1206 is provided with at least one link for transmitting traffic destined from each individual switch to the adjoining switches. Those ordinarily skilled in the art will recognize that any number of switches may be linked together in a similar fashion. In the preferred embodiment at least two links are provided between each pair of interconnected switches, which requires "central" switches such as switch 1204 to dedicate four of its links for connections to other switches. A source node 1208 connected to switching apparatus 1202 may request connection to a destination node 1210 which is connected to switching apparatus 1206 by providing a first connect sequence to the switching apparatus 1202 to which it is tied. This first connect sequence will provide a link between the source node 1208 and the switching apparatus 1204 via switching apparatus 1202. A second connect sequence generated by the source node 1208 will provide for connection of the source node 1208 to the switching apparatus 1206 via switches 1202 and 1204. Finally, the source node may generate a third connect sequence designating the destination node 1210 for full duplex communication between the source node 1208 and the destination node 1210. Switch 1206 will process the connect request in the same manner as described previously in order to provide communication between the two nodes.

It is worth noting that in the connection configurations shown in both FIG. 11 and FIG. 12, a single disconnect request transmitted by either the source or destination node will cause all of the intervening switches to disconnect all portions of the communication link between the two nodes because the disconnect request will be transmitted by each switch to the next switch, causing disconnection actions to be taken in its wake by each of the switches shortly after the disconnect request passes through each switch.

ALTERNATE EMBODIMENTS

Figure 13:
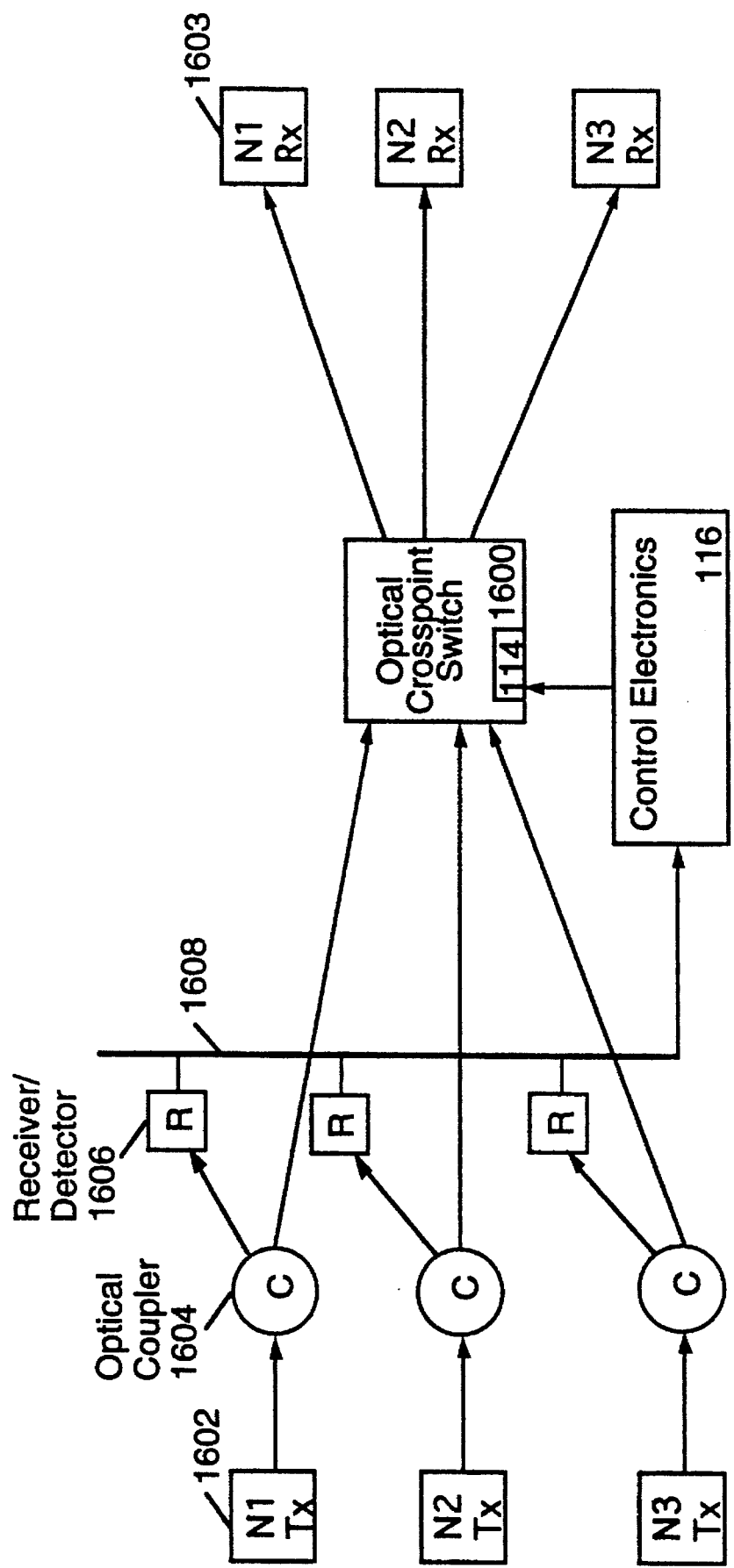
FIG. 13 is a block diagram of a switching apparatus according to a second preferred embodiment of the present invention that utilizes an optical crosspoint switch.

Referring to FIG. 13, an alternate embodiment of the present invention is shown including a optical crosspoint switch 1600. In this embodiment each node comprises a transmitter 1602 and receiver 1603. Each receiver is connected directly to the optical switch 1600 while each transmitter 1602 is connected to the optical switch 1600 via an optical coupler 1604. The optical coupler 1604 splits a percentage of the light energy received from a source node off to a receiver/detector 1606. The remaining light energy is coupled to the optical switch 1600. In this embodiment, the coupler receives the connect sequence from a source node and splits a percentage of the light energy to the receiver/detector 1606. The receiver 1606 detects the presence of the connection sequence as was described above. Those ordinarily skilled in the art will recognize that the optical switch 1600 performs much in the same way as the crosspoint switch of the preferred embodiment.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A high speed network switch comprising:

a plurality of transceivers for interfacing directly with a like plurality of nodes, each of said transceivers having a receive and transmit through port for passing data to and from said nodes, said data comprising an encoded connect sequence, a first wait sequence, and user data;

isolation means for initializing each transceiver for looping back said data;

switching means for directly connecting any pair of said transceivers; and a controller for establishing and prioritizing matrix connections and disconnections, said controller decoding said connect sequence and scheduling said switching means connections, such that a requesting node sequentially transmits said encoded connect sequence followed by said user data to said network switch assuming node-to-node communication has been established with a destination node, said isolation means looping said user data back to said requesting node when said destination node is unavailable.

2. The high speed network switch of claim 1 wherein said encoded connect sequence includes routing information.

3. The network switch of claim 1 wherein said encoded connect sequence is a series of eleven binary words including destination node data, priority data, route/data status, queued mode data and parity data.

4. The network switch of claim 1 wherein said data passed by said transceivers includes a disconnect sequence that is a single binary data word.

5. The network switch of claim 3, wherein said destination node data, priority data, route/data status, queued mode data and parity data form an 11 bit binary sequence word.

6. The network switch of claim 5, wherein said 11 bit binary sequence word is encoded to create said encoded sequence word by taking said 11 bit binary sequence word and generating an 11 word sequence wherein a transition from a binary 1 to binary zero, and a transition from a binary zero to a binary 1 result in the transmission of a first data word, while a steady state between consecutive bits results in the transmission of a second data word thereby generating a sequence of 11 data words based on the transitions between successive data bits.

7. The network switch as in claim 6, wherein said first data word is 40 bits in length and is comprised of 24 binary 1's, followed by 8 binary 0's, followed by a 01010101 binary string.

8. The network switch as in claim 4, wherein said disconnect sequence is 40 bits in length and is comprised of 24 binary 0's, followed by 8 binary 1's, followed by a 10101010 binary string.

9. The network switch of claim 1, wherein said transceivers further include a serial asynchronous receiver for decoding said encoded connect sequence.

10. The network switch of claim 9, wherein said controller further includes a like plurality of node route control state machines coupled to each of said transceivers for receiving decode routing requests from said serial asynchronous receiver in each of said transceivers;

a bus architecture for interconnecting each of said node route control state machines to a data bus;

a bus arbiter for arbitrating access to said data bus upon receipt of a connection request from any of said node route control state machines, said bus arbiter granting access to said data bus to a first requesting node route control state machine whereupon said requesting node route control state machine generates a first configuration command including requesting and destination data;

means for snooping on said data bus in each of said node route control state machines for detecting said first configuration command and determining if said first configuration command destination data is directed to its respective node;

means for generating a second configuration command upon the availability of said destination;

means for generating a switch matrix configuration responsive to said first and second configuration commands upon verification of said second configuration command.

11. The network switch of claim 10 wherein each of said node route control state machines further includes;

a selector for designating each of said node route control state machines to be associated with a preselected group of said node route control state machines forming a hunt group therein; and a hunt group state machine, said hunt group state machine responsive to said first configuration command for generating a hunt group request signal including a hunt group identification tag upon the unavailability of a destination node designated by said destination data, said hunt group state machine including means for snooping on said data bus for detecting said hunt group identification tag generated by said unavailable destination node, a request circuit for generating a request signal from an available member of an indicated hunt group to said bus arbiter for servicing a requesting node indicated by said requesting data, and means for generating said second configuration command upon a grant of said data bus to one of said available members of said hunt group by said bus arbiter, said second configuration command including said requesting data and an identification tag for said granted available member of said hunt group.

12. A method for establishing node-to-node communication in a network, said network having a plurality of nodes directly connected to a network switch having a like plurality of transceivers, a switch matrix, a controller having a like plurality of node state machines, and a blind interrogation data format including an encoded connect sequence, a first wait sequence, user data and a disconnect sequence, the method comprising the steps of:

(a) initializing said switch matrix to loop-back transmissions for each transceiver;

(b) initiating a first communication link between a requesting node and a destination node, said requesting node transmitting an encoded connect sequence, a first wait sequence and user data to a first transceiver of said network switch;

(c) decoding said encoded connect sequence received by said first transceiver to derive destination and route data;

(d) coupling said derived destination and route data to an associated node state machine in said controller, said associated node state machine placing said destination and route data on a data bus;

(e) snooping on said data bus by each of said plurality of node state machines to determine if said destination node corresponds to their associated node, (f) placing an authentication word on said data bus by said state machine associated with said destination node upon the availability of said destination node;

(g) configuring said switch matrix to connect said requesting node to said destination node when said authentication word has been placed on said data bus; and (h) looping said user data back to said requesting node when said destination node is unavailable.

13. A method for establishing node-to-node communication in a network, said network having a plurality of nodes directly connected to a network switch having a like plurality of transceivers, a switch matrix, a controller having a like plurality of node state machines, and a blind interrogation data format including an encoded connect sequence, a first wait sequence, user data and a disconnect sequence, the method comprising the steps of:

(a) initializing said switch matrix to loop-back transmissions for each transceiver;

(b) selecting ones of said nodes for association in a hunt group;

(c) initiating a first communication link between a requesting node and a destination node, said requesting node transmitting an encoded connect sequence, a first wait sequence and user data to a first transceiver of said network switch;

(d) decoding said encoded connect sequence received by said first transceiver to derive destination and route requestor data;

(e) coupling said derived destination and route requestor data to an associated node state machine in said controller, said associated node state machine placing said destination and route requestor data on a data bus;

(e) snooping on said data bus by each of said plurality of node state machines to determine if said destination node corresponds to their associated node, (f) placing an authentication word on said data bus by said state machine associated with said destination node upon the availability of said destination node;

(g) placing a hunt group request signal including a hunt group identification tag on said data bus if said destination node is unavailable and said destination node is in said hunt group;

(h) issuing a service request signal responsive to said hunt group request signal by all available members of said hunt group;

(I) arbitrating between said available hunt group members and selecting one of said available hunt group members to service said first communication link;

(j) placing an authentication word on said data bus by selected one of said hunt group members indicating route requestor data and destination data, said destination data including an identification tag for said selected one of said hunt group members;

(k) configuring said switch matrix to make said first communication link based on said destination and route requestor data when said authentication word has been placed on said data bus; and (l) looping said user data back to said requesting node when said destination node and all hunt group members are unavailable.

14. A high speed network switch comprising:

a plurality of transceivers for interfacing directly with a like plurality of nodes, each of said transceivers having a receive and transmit through port for passing data to and from said nodes and said network, said data comprising an encoded connect sequence, a first wait sequence, user data and a disconnect sequence, each of said transceivers having a serial asynchronous receiver for decoding said encoded connect sequence and outputting a routing information word;

a switch matrix for directly routing data between said transceivers, said switch matrix comprising a switch matrix controller, a plurality of ports, and means for switching data between said ports, each of said transceivers coupled to one of said plurality of ports of said switch matrix, said switch matrix for cross coupling receive and transmit through ports for any pair of transceivers of said network switch;

a controller for establishing and prioritizing matrix connections and disconnections, said controller comprising (a) a like plurality of node route state machines each coupled to one of said transceivers and receiving said routing information word;

(b) a data bus connecting each of said node route state machines;

(c) a bus arbiter for prioritizing access requests from each of said node route state machines for access to said data bus, said bus arbiter granting control of said data bus to a single authorized node route state machine at a time;

(d) means for placing a routing command including a destination node ID on said data bus by said authorized node route state machine;

(e) snooping means in each of said node route state machines for determining if said routing command on said data bus is directed to their associated node, and if their associated node is available for connection;

(f) authentication means in each of said node route state machines to place an authentication word on said data bus if said routing command is directed to said associated node and said associated node is available;

(g) a state machine engine for processing said routing commands and authentication words to update a routing table and issue switch configuration commands; and (I) a sequence generator responsive to said routing commands for formatting instructions to be passed to said switch matrix controller for configuring said switch matrix; and signals having a blind interrogation data format transmitted by said nodes to said transceivers for establishing node-to-node communication whereby a requesting node sequentially transmits said encoded connect sequence and user data assuming said node-to-node communication has been established, said switch matrix looping said user data back to said requesting node when said destination node is unavailable.

15. The network switch of claim 14 wherein said switch matrix couples each of said transceivers receive through port to said same transceiver transmit through port while said nodes are inactive.

16. A high speed network switch comprising:

a plurality of transceivers for interfacing directly with a like plurality of nodes, each of said transceivers having a receive and transmit through port for passing data to and from said nodes and said network, said data comprising an encoded connect sequence, a first wait sequence, user data and a disconnect sequence;

first switching means for looping back said data for each of said transceivers to said nodes;

a second switching means for connecting any pair of said transceivers;

a controller for establishing and prioritizing matrix connections and disconnections, said controller decoding said encoded connect sequence and scheduling said second switching means connections; and signals having a blind interrogation data format transmitted by said nodes to said transceivers for establishing node-to-node communication, such that a requesting node sequentially transmits said encoded connect sequence and user data to said network switch assuming said node-to-node communication has been established with a destination node, said first switching means looping said user data back to said requesting node when said destination node is unavailable.

17. A high speed network switch comprising:

a plurality of transceivers for interfacing directly with a like plurality of nodes, each of said transceivers having a receive and transmit through port for passing data to and from said nodes and said network, said data comprising an encoded connect sequence, a first wait sequence, user data and a disconnect sequence;

a switch matrix for directly routing data between said transceivers, said switch matrix comprising a switch matrix controller, a plurality of ports, and means for switching data between said ports, each of said transceivers coupled to one of said plurality of ports of said switch matrix, said switch matrix for cross coupling receive and transmit through ports for any pair of transceivers of said network switch;

a controller for establishing and prioritizing matrix connections and disconnections, said controller initializing each of said switch matrix ports for loop-back; and signals having a blind interrogation data format transmitted by said nodes to said transceivers for establishing node-to-node communication, whereby a requesting node sequentially transmits said encoded connect sequence and user data assuming said node-to-node communication has been established, said switch matrix looping said user data back to said requesting node when said destination node is unavailable.

\* \* \* \* \*